US012568374B2

(12) United States Patent
Vilmos

(10) Patent No.: US 12,568,374 B2
(45) Date of Patent: Mar. 3, 2026

(54) CLOUD COMPUTING ENVIRONMENT AND A METHOD FOR PROVIDING REMOTE SECURE ELEMENT SERVICES

(71) Applicant: SAFEPAY SYSTEMS KFT., Budapest (HU)

(72) Inventor: András Vilmos, Budapest (HU)

( * ) Notice: Subject to any disclaimer, the term of this patent is extended or adjusted under 35 U.S.C. 154(b) by 298 days.

(21) Appl. No.: 18/259,045

(22) PCT Filed: Nov. 17, 2021

(86) PCT No.: PCT/HU2021/050061
§ 371 (c)(1),
(2) Date: Jun. 22, 2023

(87) PCT Pub. No.: WO2022/136893
PCT Pub. Date: Jun. 30, 2022

(65) Prior Publication Data
US 2024/0056821 A1      Feb. 15, 2024

(30) Foreign Application Priority Data

Dec. 22, 2020    (HU) .................................... P2000448

(51) Int. Cl.
*H04W 12/48* (2021.01)
*H04W 12/06* (2021.01)
(Continued)

(52) U.S. Cl.
CPC ......... *H04W 12/48* (2021.01); *H04W 12/068* (2021.01); *H04W 12/45* (2021.01); *H04W 12/009* (2019.01); *H04W 12/43* (2021.01)

(58) Field of Classification Search
CPC ............... H04W 12/48; H04W 12/068; H04W 12/009; H04W 12/43
See application file for complete search history.

(56) References Cited

U.S. PATENT DOCUMENTS

| | | | | |
|---|---|---|---|---|
| 2014/0282536 A1* | 9/2014 | Dave | .................. | G06Q 30/0631 718/1 |
| 2015/0006474 A1* | 1/2015 | Halder | .................... | G06F 16/93 707/608 |

(Continued)

OTHER PUBLICATIONS

Pascal, U. "Innovative mobile payments in the cloud for connected citizen: The MobiSIM project", 2016 18th Mediterranean Electrotechnical Conference (Melecon), 2016, pp. 1-6 (six (6) pages).
Pascal, U. "Towards token-requester for epayment based on cloud of secure elements and HCE mobiles", 2015 First Conference on Mobile and Secure Services, 2015, pp. 1-2 (two (2) pages).
(Continued)

*Primary Examiner* — Ellen Tran
(74) *Attorney, Agent, or Firm* — Crowell & Moring LLP

(57) ABSTRACT
A cloud computing environment for providing remote secure element services, comprising at least one server, a plurality of secure elements being connectable to the at least one server, each secure element having a secure element identifier and comprising at least one secure element application having a secure element application identifier, each secure element application being uniquely addressable by the at least one server with the secure element identifier of the secure element containing the given secure element application and the secure element application identifier of the given secure element application. A method for providing secure element services performed by the cloud computing environment is also disclosed.

20 Claims, 19 Drawing Sheets

(51) Int. Cl.
H04W 12/45 (2021.01)
H04W 12/00 (2021.01)
H04W 12/43 (2021.01)

(56) References Cited

U.S. PATENT DOCUMENTS

| 2015/0244706 | A1* | 8/2015 | Grajek | ............... | H04L 63/0815 |
| | | | | | 726/6 |
| 2016/0005036 | A1 | 1/2016 | Tervo et al. | | |
| 2016/0164880 | A1* | 6/2016 | Colesa | .................... | G06F 21/53 |
| | | | | | 726/1 |
| 2018/0077144 | A1* | 3/2018 | Gangawane | .......... | H04L 63/102 |
| 2021/0160231 | A1* | 5/2021 | Kumar | ................ | H04L 63/0815 |

OTHER PUBLICATIONS

Osptalliance: "HCE Synergies with Public Transport CIPURSE(TM) and HCE open up new possibilities for Transit Ticketing Systems" 2016, [retrieved on Feb. 17, 2022]. Retrieved from the Internet: <URL:http://www.osptalliance.org/assets/1/6/OSPT_WHITEPAPER_HCE_FINAL.pdf>.

International Search Report dated Feb. 28, 2022 (4 pages) from PCT Priority Application PCT/HU2021/050061 filed Nov. 11, 2021.

Written Opinion of the International Searching Authority dated Feb. 28, 2022 (6 pages) from PCT Priority Application PCT/HU2021/050061 filed Nov. 11, 2021.

International Preliminary Report on Patentability (9 pages) dated Mar. 14, 2023 from PCT Priority Application PCT/HU2021/050061.

* cited by examiner

S20 — Receiving SE service request

S22 — Identifying user account

S24 — Identifying CINx+AIDy

S26a — Selecting SE - CINx

S26b — Selecting SE app. - AIDy

S26 — Sending SE service request to SE app.

S28 — Processing SE service request

S29 — Sending transaction response

S20 —— Receiving SE service request

S24 —— Identifying CINx+AIDy

S26a —— Selecting SE - CINx

S26b —— Selecting SE app. - AIDy

S26 —— Sending SE service request to SE app.

S28 —— Processing SE service request

S29 —— Sending transaction response

CLOUD COMPUTING ENVIRONMENT AND A METHOD FOR PROVIDING REMOTE SECURE ELEMENT SERVICES

CROSS-REFERENCE TO RELATED APPLICATIONS

This application is a U.S. national stage application under 35 U.S.C. § 371 of PCT Application No. PCT/HU2021/050061, filed on Nov. 17, 2021, and published as WO2022136893A1 on Jun. 30, 2022, which claims priority from Hungarian Application No. P2000448, filed on Dec. 22, 2020, the entirety of which are each hereby fully incorporated by reference herein.

TECHNICAL FIELD

The present disclosure relates to a method and computing environment for providing remote secure element service.

BACKGROUND

A secure element (SE) is a chip card (or other type of tamper resistant environment, like Trusted Execution Environment—TEE) which can store sensitive data and some may run secure applications such as payment applications. It acts as a vault, protecting applications and data stored inside the SE from misuse, malware, or other attacks that are typical in the host, i.e. the device to which the secure element is connected for operating the secure element. The SE may be a SIM card or a plastic smart card or built into a hardware platform or may also have other form factors as well. In order to access applications and data stored on the SE the user needs to connect the SE to a host device equipped with an appropriate chip card reader/writer for acting as an interface between the user and the SE, or the SE needs to be integrated into the host, like in case of an embedded secure element. Such a host device can be the user's mobile phone, personal computer, laptop, tablet or similar device.

Although SEs provide high security their usage can be rather inconvenient or restricted for a number of reasons. SEs in the form of a smart card require a special smart card reader, hence the user has to carry both the smart card and the reader with him or her to access the applications and data stored on the SE. In case of contactless smart cards usability may be improved if the users' host device (e.g. mobile handset) has contactless NFC interface, because it can substitute a separate reader device. Some SEs can be integrated into the host device, for example the SEs provided in the form factor of SIM cards can be stored permanently inside a mobile phone, tablet or other SIM enabled mobile communication device, however, such communication devices can hold only a limited number of SIMs (generally only one or two), which means the user may need to carry any additional SIM, moreover replacing a SIM in the communication device is typically inconvenient and may even require special tools. A more important barrier to such an architecture is the fact that SIM cards are in general controlled by the mobile network operators, which may limit utilisation of this type of secure element for other purposes than that of their own ones. Similar restrictions may be limiting the use of the embedded secure elements or TEEs as these SEs may be controlled by the device manufacturers, OEMs.

SUMMARY

It is an objective to overcome the problems associated with the prior art. In particular, it is an objective to eliminate the need of having to carry a device independent, separate SE for accessing its content or having to involve a controlling 3$^{rd}$ party like a mobile operator or device manufacturer.

The inventor has realised that the above described problems can be overcome by providing SEs as part of a cloud computing environment and by allowing users to access applications running on the SEs remotely. It is one objective of the inventor to establish a strong security for the secure element transactions in the cloud computing environment matching the level of those transactions when the secure element is directly accessible (carried) by the user. For this reason, optionally multi factor authentication is performed before any transactions may be executed.

Accordingly, the present disclosure relates to a cloud computing environment for providing remote secure element services, comprising at least one server, a plurality of secure elements being connectable to the at least one server, each secure element having a secure element identifier and comprising at least one secure element application having a secure element application identifier, each secure element application being uniquely addressable by the at least one server with a unique address comprising the secure element identifier of the secure element containing the given secure element application and the secure element application identifier of the given secure element application, the cloud computing environment further comprising a database containing a list of the unique addresses.

The present disclosure further relates to a method for providing remote secure element services, comprising providing at least one server and a plurality of secure elements connected to the at least one server as part of a cloud computing environment, each secure element comprising at least one secure element application, and performing in the cloud computing environment the steps of:

assigning one of said secure element applications on one of said plurality of secure elements to a user, the assigned secure element having a secure element identifier and the assigned secure element application having a secure element application identifier, receiving by the server a secure element service request from the communication device of the user over the electronic communication channel, executing the secure element service request by:

identifying the secure element application assigned to the user based on the secure element identifier and the secure element application identifier, forwarding the secure element service request to the assigned secure element application, processing the secure element service request by the assigned secure element application, and sending a transaction response to the user communication device.

Further advantageous embodiments of the invention are defined in the appended dependent claims.

BRIEF DESCRIPTION OF THE DRAWINGS

Further details of the invention will be apparent from the accompanying figures and exemplary embodiments.

FIG. 1$b$ is a schematic block diagram of a high-level architecture of another exemplary cloud computing environment for implementing the method according to the invention.

DETAILED DESCRIPTION

Figure 1A:
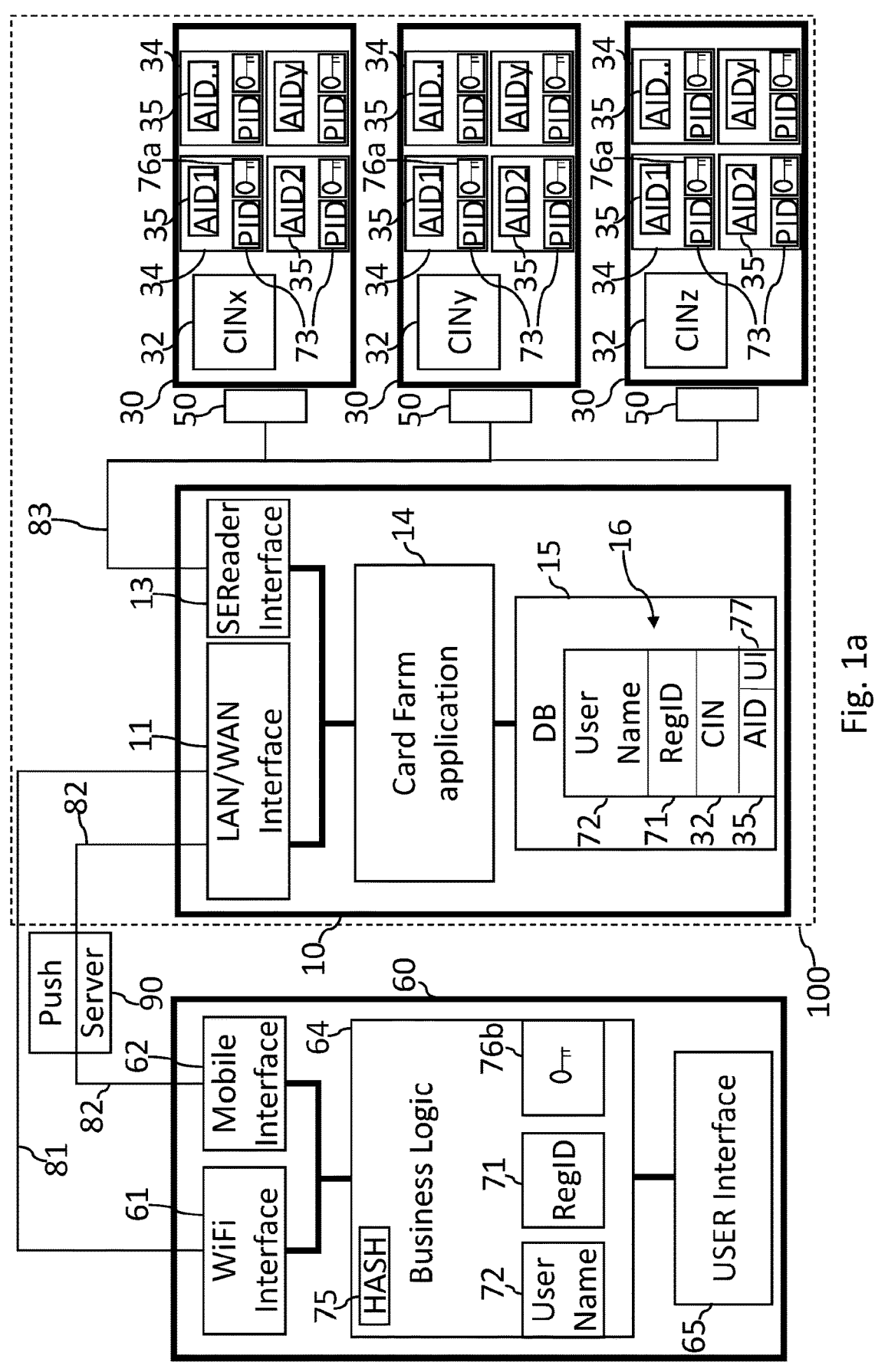
FIG. 1$a$ is a schematic block diagram of a high-level architecture of an exemplary cloud computing environment for implementing the method according to the invention.
FIG. 1c is a schematic block diagram of a high-level architecture of another exemplary cloud computing environment for implementing the method according to the invention.
FIG. 1d is a schematic block diagram of a high-level architecture of a further exemplary cloud computing environment for implementing the method according to the invention.

FIG. 1a schematically illustrates a high-level architecture of an exemplary cloud computing environment 100 wherein the method according to the invention can be implemented. The cloud computing environment 100 comprises a cloud server 10 and a plurality of secure elements formed as chip cards 30. In the embodiment presented in FIG. 1a each chip card 30 is connected to the server 10 via an individually addressable chip card reader writer 50. For the sake of briefness hereinafter the chip card reader writer 50 is referred to as chip card reader 50 but it in the context of the present invention the chip card reader 50 is capable of both reading and writing the chip card 30 to which it is connected. In the present example each chip card 30 is connected to the server through a separate chip card reader 50, however other embodiments are also conceivable like the one wherein the server is connected to a multiple chip card reader device which is configured to read and write a plurality of chip cards 30, which, for example, may be inserted into separate chip card receiving slots of the multiple chip card reader. In a different architecture a single chip card reader connected to the server may be capable of reading multiple chip cards 30 connected to each other.

The chip card 30 can be any kind of chipcard suitable for storing data and optionally also executing applications. Each chip card 30 has a chip card identifier 32, commonly referred to as CIN (Card Image Number, an identifier for a specific card as per the de facto smart card standard of Global Platform) although it is clear other type of unique secure element IDs could also be used especially for other types of SEs like the TEE. The CIN 32 indicated in FIG. 1a are labelled CINx, CINy, CINz in order to emphasise that each chip card 30 has a unique CIN 32. The applications 34 stored on each secure element, in the present scenario chip card 30, have an application identifier (AID) 35. (For other type of secure applications eg. TAs in the TEE may have different IDs) The AID 35 indicated in FIG. 1a are labelled AID1, AID2, AIDy in order to emphasise that each chip card 30 may store multiple applications 34 each having its own AID 35. The AIDs 35 need only be unique within the same card 30 since each application is identified with the CIN 32 of the chip card 30 and the AID 35 of the application within the given chip card 30. Some or all the chip card applications may be stored in the same or separate security domains as is well known to the person skilled in the art. In some implementations of the present disclosure it is also conceivable that what we call applications 34 on the secure element 30 are simply memory partitions of the secure element and the AID 35 identifies these dedicated storage spaces.

The cloud server 10 may be a designated server hardware which is running software that allows the computer to communicate with remote clients. It is noted that such a hardware may also be owned/operated by the user itself and does not necessarily need to be placed in the cloud. Alternatively, the cloud server could also be one or more virtual machines running on assigned or shared platforms, like hosted applications in public clouds. The best-known shared platforms being Azure, AWS, Google Cloud Platform, with many smaller players besides. The server 10 may have any conventional hardware structure including at least one non-volatile memory for storing data and software applications and at least one central processing unit for executing the software applications (not shown). As arranged, the central processing unit and/or the cloud server 10 may be configured to implement one or more steps or functions of the various methods disclosed herein. The cloud computing environment 100 may comprise more than one server 10. The one or multiple chip card readers 50 are connected to a physical computer which may be the cloud server 10 itself or a separate device which is connected to the cloud server 10 through remote or proximity interfaces/channels as shown, by way of an example, in FIG. 1b.

In the present example the remote client is a user communication device 60 capable of receiving mobile PUSH messages, such as a mobile phone, a tablet, a laptop or other personal computer preferably with mobile connectivity LTE (Long-Term Evolution) which is a standard for wireless broadband communication for mobile devices and data terminals, based on the GSM/EDGE and UMTS/HSPA technologies. The user communication device 60 may have a conventional hardware structure comprising at least one non-volatile memory and at least one central processing unit for executing software applications stored in the non-volatile memory (not shown). As arranged, the central processing unit and/or the communication device 60 may be configured to implement one or more steps or functions of the various methods disclosed herein. The communication device 60 is provided with user interface 65 for inputting and outputting data. The type of the user interface 65 depends on the type of the communication device 60, for example, in the case of a mobile phone or a tablet the user interface 65 may include touchscreen (input and output interface), speaker (output interface), microphone (input interface). In the case of a laptop or other personal computer the user interface 65 generally comprises separate input and output interfaces 65 such as keyboard, mouse, display, speaker, microphone, etc, although also these devices may have integrated input-output interface 65 such as a touchscreen. Any of these devices may also have one or more types of biometric sensors (e.g.: like fingerprint reader) or may run software applications which can capture biometric information (e.g.: like retina scanners, Face ID) which may also be considered input interfaces for specific information.

The server 10 and the user communication device 60 are connectable to each other by an electronic communication channel 81, which is established over the Internet as illustrated in FIG. 1*a* and which is an encrypted communication channel in at least one example. Physically the electronic communication channel 81 is wireless (e.g. WiFi, cellular network) but may be combined with wired connection, as is well known to a person skilled in the art. The electronic communication channel 81 is understood to include the physical transmission medium, in other words the hardware components (e.g. cables, connectors, signal generators, amplifiers, etc.), and a (typically encrypted) logical connection established over a multiplexed medium (e.g. radio channel).

Both the server 10 and the user communication device 60 comprise interfaces for data communication over the Internet, in the present case WiFi interface 61 in the user communication device 60 and LAN/WAN interface 11 in the server for establishing the communication channel 81 and communicating therethrough. In order to perform the method according to the invention the user communication device 60 can also receive a mobile push message through its mobile communication interface 62 initiated by the server 10 which can be transmitted through the internet with the use of a push server 90. The push message is sent over a second logical communication channel and this will be referred to as PUSH communication channel 82. As it is well known to a person skilled in the art, mobile push messages are transmitted with the use of a push server 90 from one party, in the present case the server 10, to another party, in the present case the user application 64 on the user communication device 60 addressed by the instance ID (RegID) 71 of the user application 64. For example, Google Inc. (Firebase Cloud Messaging) and Apple Inc. both provide push servers to deliver mobile push messages, which is commonly made use of by various mobile applications and mobile service providers. Alternatively, instead of sending a push message it is also conceivable to send the message by SMS, e-mail, a chat message or any other electronic communication type that allows to address the user or the user application 64 or the user communication device 60, and which other electronic communication type uses a communication channel, even if only a logical one (PUSH channel 82), which is different from the electronic communication channel 81 through which the registration or service request is received. Such messages may also be received by other than the mobile communication interface 62 of the user communication device. Accordingly, whenever a PUSH (with capital letters) message is mentioned in the present disclosure this reference should be interpreted to also cover different kinds of addressable messages sent over said other electronic communication channel and when the user communication device requires the capability of receiving a PUSH message it may be satisfied with the capability of receiving mobile push message, SMS, e-mail, chat or any other type electronic messages using said other electronic communication channel.

Figure 1B:
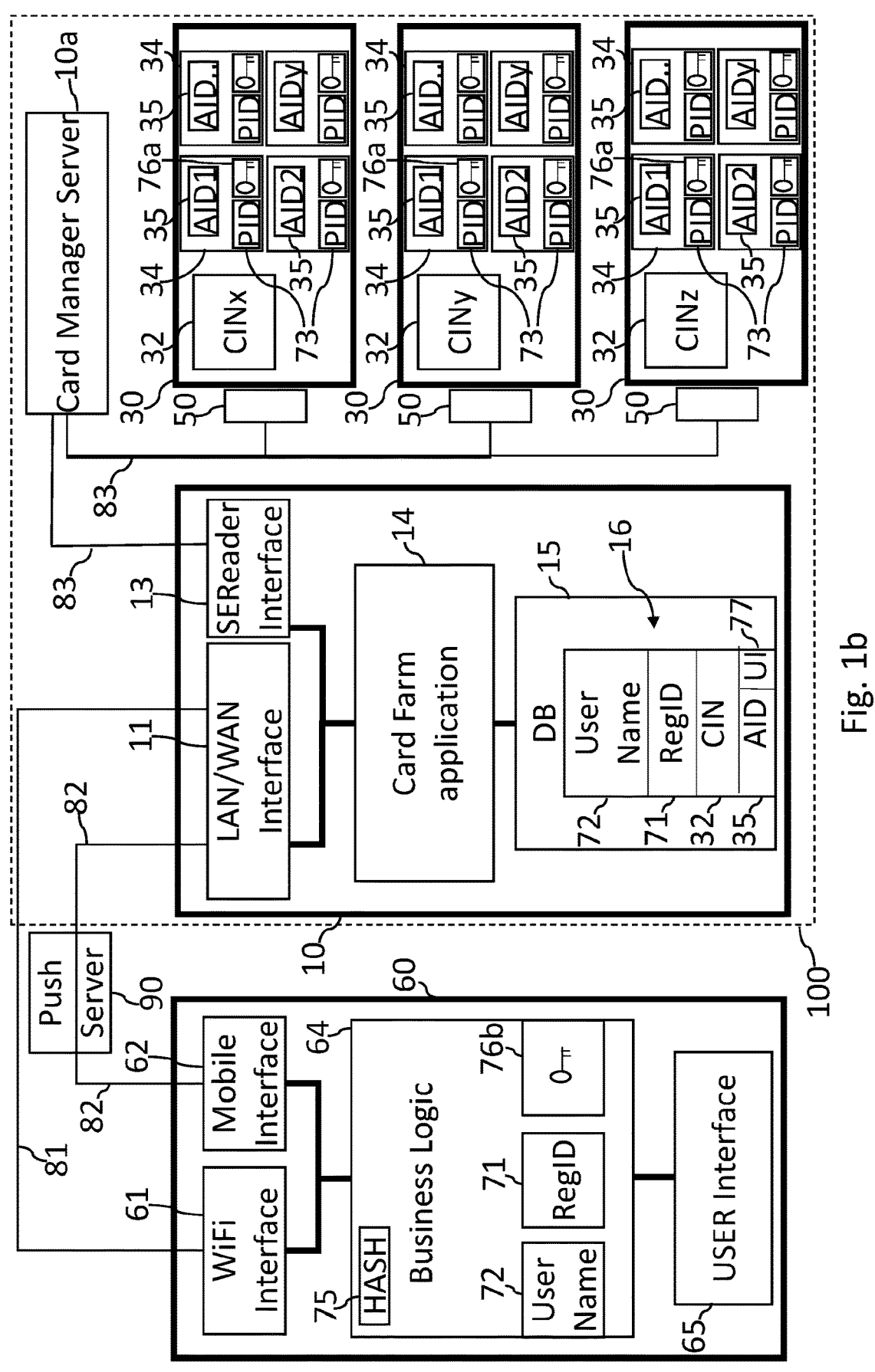

The server 10 further comprises an interface 13 to the chip card readers for communicating with the chip card reader 50. The communication may take place over a wired or wireless communication channel 83 (also hardware components and logical channel) as is well known to a person skilled in the art depending on the type of architecture used. Cards may be directly connected to the server 10 or are remotely operated connected to an assigned card manager server 10*a* as schematically shown in FIG. 1*b*. The card manager server 10*a* also have CPUs, non-volatile memory, communication interfaces and other physical components as well as software applications running on it as it is usual for ordinary computer devices, which are however not shown in detail for the sake of simplicity. As arranged, the central processing unit and/or the card manager server 10*a* may be configured to implement one or more steps or functions of the various methods disclosed herein. If the secure elements (e.g. chip cards) 30 are connected to the card manager server 10*a*, then this server 10*a* preferably acts as a bridge in the communication between the cloud server 10 and a given chip card 30. The presence of this card manager server 10*a* does not change the method according to the invention in its essence.

A server application (Card Farm application) 14 is stored in the non-volatile memory of the cloud server 10 which is used to provide remote secure element (chip card) services to remote clients such as the user communication device 60 when executed by the central processing unit of the server 10. The server application 14 contains or it can access at least one database 15 which is also stored in the non-volatile memory of the cloud server 10 and wherein data is stored in relation to each user account 16 as will be explained in more detail in connection with the method according to the invention.

The user communication device 60 stores a user application 64 communicating with the server application 14 in order to perform registration and access the chip card services offered by the invention. When the user application 64 first connects to the mobile network it receives an application instance ID, a unique registration identifier (RegID) 71, which allows push messages to be sent to a specific user application 64.

Figure 1C:
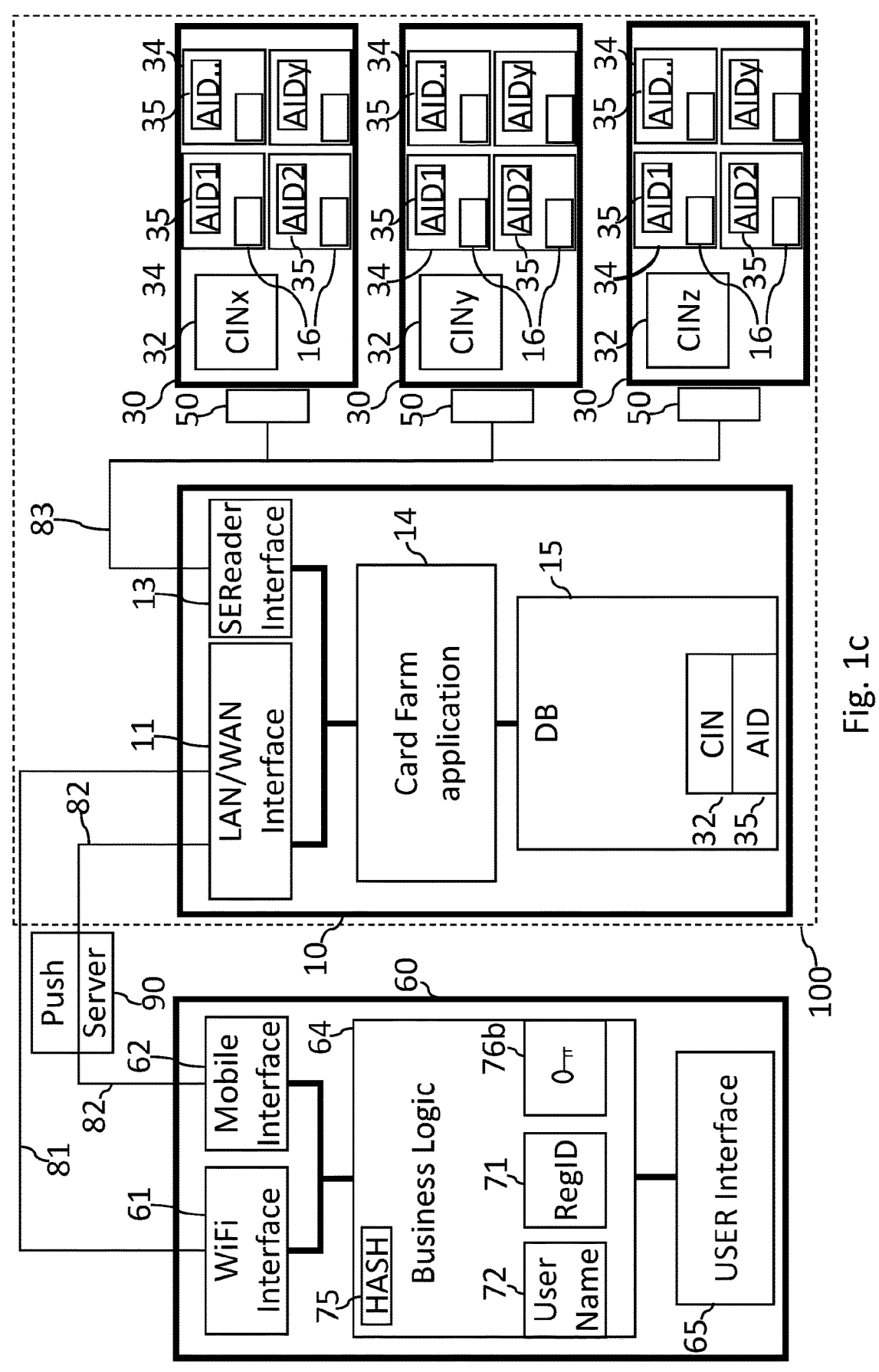

FIG. 1*c* is the block diagram of another exemplary cloud computing environment 100 according to the invention, which is similar to the one described with reference to FIG. 1*a*. For the sake of easier comprehension corresponding elements on FIG. 1*c* are indicated with the same reference numerals as in FIG. 1*a*. The main difference between the cloud computing environment of FIG. 1*c* is that the user account 16 is stored in the SE application 35 assigned to the given user and the database 15 stores information about to the secure elements 30 and the SE applications 34 thereon which may be the CIN 32 and AID 35 for purpose of identification as illustrated with a single pair of CIN 32 and AID 35 in FIG. 1*c*. Optionally, other data may be stored as well.

Figure 1D:
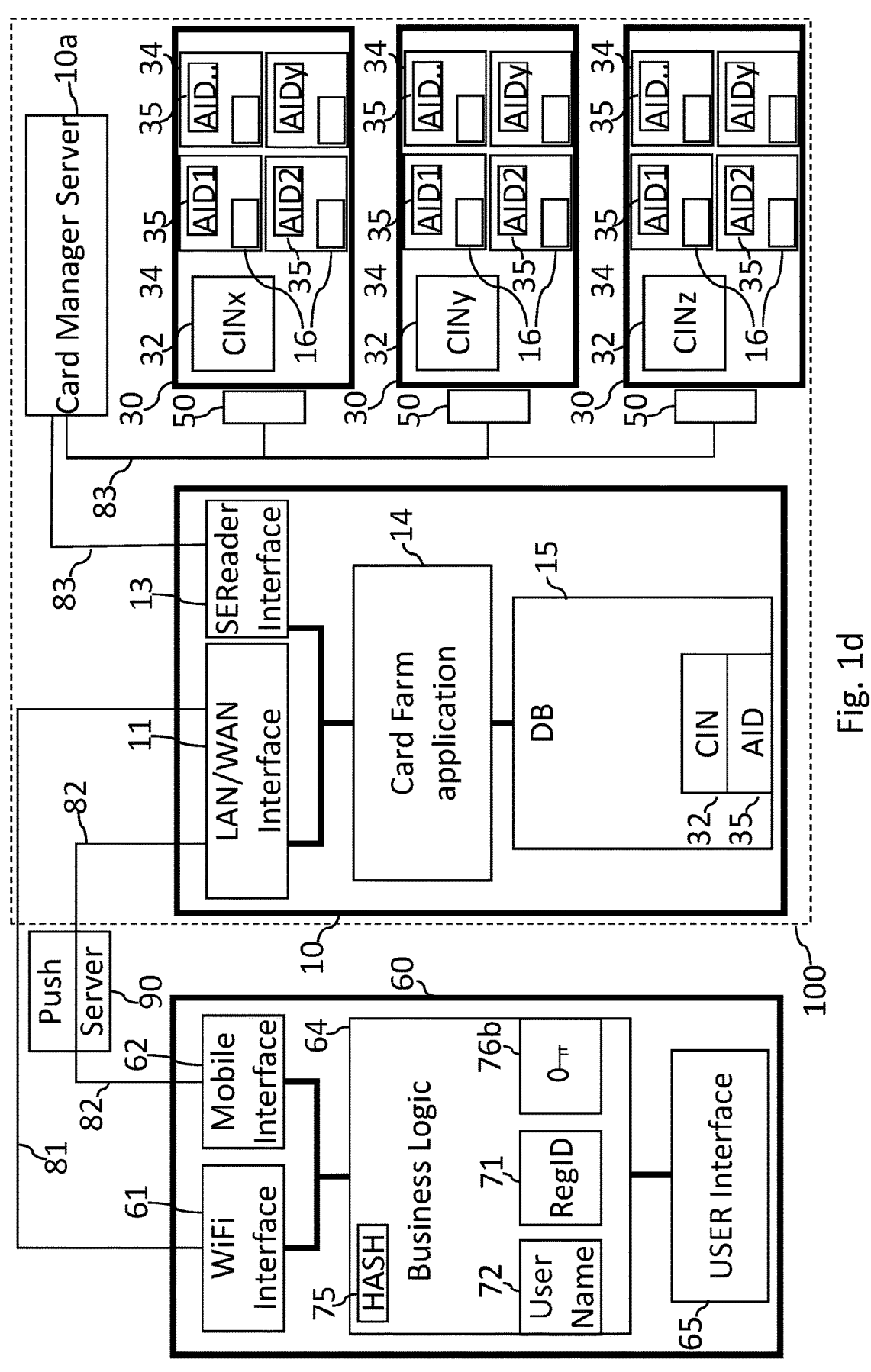

FIG. 1*d* illustrates a modification of the cloud computing environment of FIG. 1*c* wherein the secure elements 30 are connected to the cloud server 10 via the interposition of a similar card manager server 10*a* as discussed in connection with FIG. 1*b*.

The method according to the present invention will now be presented with reference to the exemplary cloud computing environment 100 and user communication device 60 illustrated in FIGS. 1*a* to 1*d*, however, it should be appreciated that other hardware and software architecture may be used to implement the method.

Figure 2A:
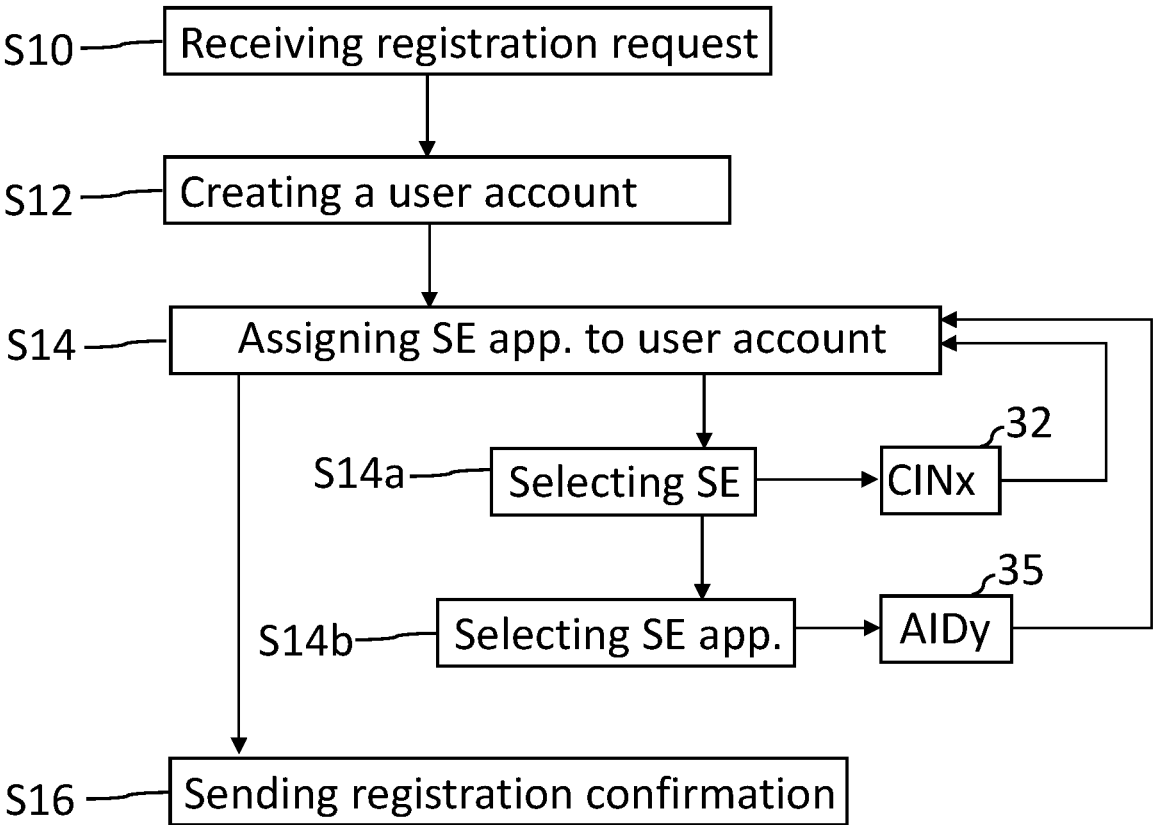
FIG. 2a is a schematic flow diagram of a registration process according to various embodiments of the method according to the invention.
Figure 2B:
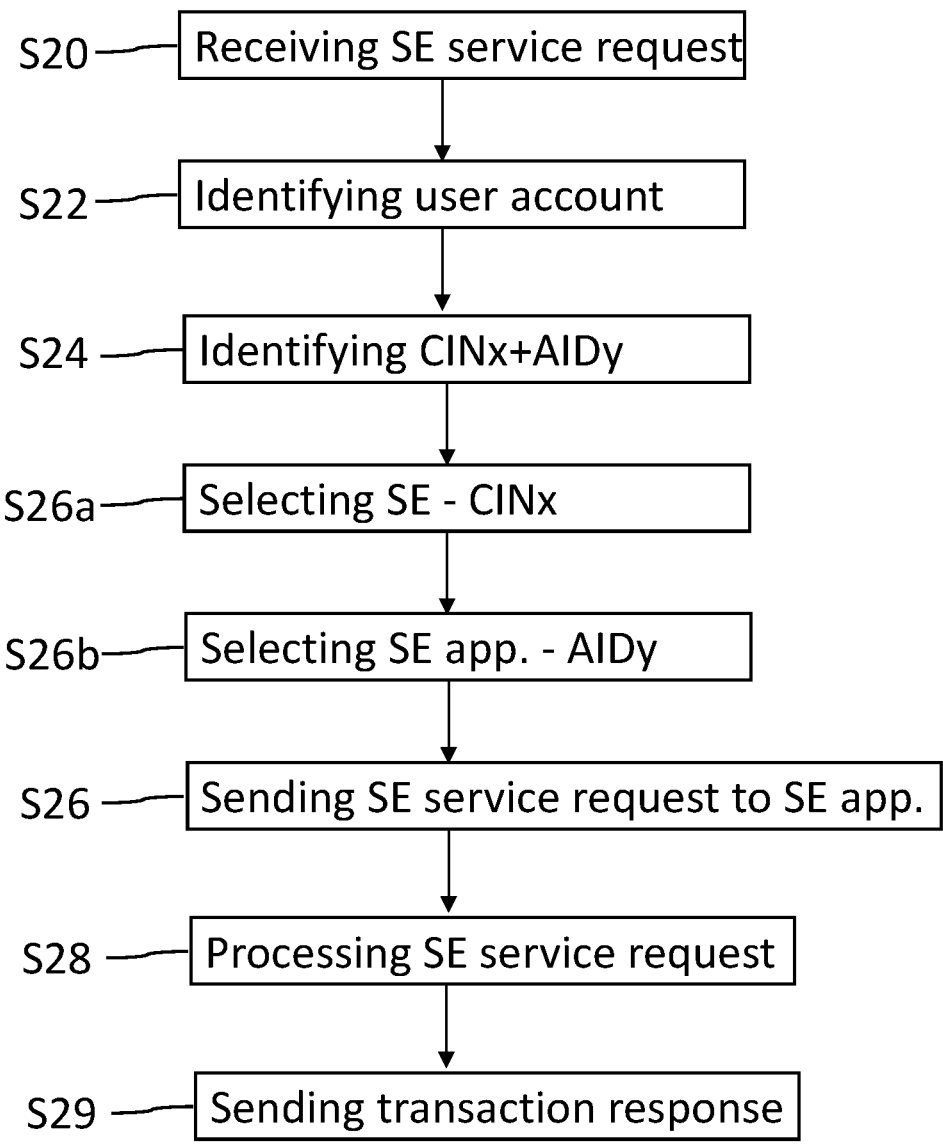
FIG. 2b is a schematic flow diagram for providing an SE service according to a preferred embodiment of the method according to the invention.

The flow diagrams of FIGS. 2a and 2b show the basic steps of a first embodiment of the method according to the invention which can be performed e.g. by the cloud computing environment 100 illustrated in FIGS. 1a and 1b. In step S10 of FIG. 2a a registration request is received by the server 10 from the user communication device 60. The registration request is an electronic message containing at least data pertaining to the user (user specific data), and data initiating a registration process for accessing remote secure element services provided by the plurality of secure elements 30 of the cloud computing environment 100. Such user specific data may contain one or more of the following: username 72, user application identifier (RegID 71), IMEI (International Mobile Equipment Identity) number of the user communication device 60 or other similar data that can be used to identify the user, the user communication device 60 or the application 64 running on it.

It is noted that the steps described as being carried out by the server 10 are generally carried out by the server application 14 although other software and hardware components may take part in the execution as well, for example in case of the embodiment illustrated in FIGS. 1a and 1b the LAN/WAN communication interface 11 is used by the server application 14 to receive the registration request in step S10.

In response to the registration request the server 10 creates a user account 16 in step S12 for the user requesting registration. The user specific data that was received in the registration request is preferably included in the user account.

A secure element application 34 is also assigned to the user account in step S14. This may be carried out by selecting in step S14a a secure element 30 from among the plurality of secure elements 30, and selecting in step S14b a suitable secure element application 34 installed in the selected secure element which is not assigned yet to any other user, or has been revoked from a previous user. Alternatively, the suitable secure element application 34 may be installed on the selected secure element as part of the registration process. The selected secure element 30 has a secure element identifier CINx 32 and the selected (or presently installed) secure element application 34 has a secure element application identifier AIDy 35. The letters x and y are arbitrary numbers denoting that the x$^{th}$ secure element and its y$^{th}$ secure element application 34 has been assigned to the currently created user account 16. Preferably CINx 32 and AIDy 35 are also stored for the user account 16.

Preferably, the registration is confirmed to the user in a confirmation message sent back to the user application 64 in the user communication device 60 from the server application 14 running on the server 10 in Step S16.

Once the user has been successfully registered the cloud computing environment can provide a secure element service for the user. The steps of providing the secure element service are illustrated in FIG. 2b.

In step S20 a secure element service request is received by the cloud server 10 from the user communication device 60. The secure element service request is an electronic message containing at least data allowing the user account to be identified. The secure element service request may be received in a single electronic message. Alternatively, the secure element service request may be received in more than one electronic message, in which case a combination of the more than one electronic message contains the whole secure element service request. Based on the data contained in the secure element service request, the secure element application 34 assigned to the user account is identified. This is preferably carried out by first identifying the user account 16 in step S22 and then identifying the corresponding CINx 32 and AIDy 35 in step S24 for the assigned secure element application 34. In step S26 the secure element service request is routed to the secure element application 34 based on the CINx 32 and AIDy 35 selected in steps S26a and S26b. Any suitable conventional card management protocol may be used for performing these steps. In case the secure element 30 containing the assigned secure element application 34 is connected to a card managing server 10a (as shown in FIG. 1a), then in the step S26 of sending the secure element service request to the secure element application further includes transmitting the secure element service request to, and in case multiple servers are used also determining and addressing the card managing server 10a (e.g. using a look-up table) to which the given secure element 30 is connected after which the card managing server 10a is used as a proxy and/or as a message converter to forward the secure element service request to the assigned secure element application 34 defined by the CINx 32 and the AIDy 35.

The secure element service request sent to the assigned secure element application 34 is derived from and may not be necessarily exactly the same electronic message (not only in format but in terms of content as well) as received by the cloud server 10 from the user communication device 60. According to a preferred embodiment the server 10 creates a new message as any data not used by the secure element application 34 need not be transmitted from the original secure element service request, though other information (e.g. package ID) may need to be added. Hence the secure element service request transmitted by the cloud server 10 to the assigned secure element application 34 may have the same content as the original secure element service request or it may be a modified secure element service request serving the same original purpose.

In another preferred embodiment the first part of the secure element service request may be used to identify the secure element 30 and the secure element application 34 thereon which are associated with the user account and then a direct channel can be established between the user application 64 on the user communication device 60 and the secure element application 34 assigned to the user account over which the rest of the secure element service request may be communicated (e.g. authentication data, transaction data, etc.).

The secure element application 34 on the identified secure element 30 processes the secure element service request in step 28, and a transaction response is sent back to the user application 64 on the user communication device 60 in step S29. The transaction response may contain data requested from the secure element application 34 in the secure element service request, such as data stored in the secure element application 34 or data signed by the secure element application or other data generated by the secure element application 34. In case the secure element service cannot be performed the transaction response may contain a failure notice.

In various examples, the secure element service request contains user specific data, personnel identification data, service request validator and transaction information.

The user specific data may contain a username, a user application identifier (RegID) 71, an IMEI number of the user's mobile phone used as the communication device 60 or other data suitable for identifying a user or a user communication device 60, or any combination of such data. The user specific data is used by the cloud server 10 in step S22 to identify the user account registered for the given user, user communication device 60 or user application 64.

The service request validator corresponds to data sent to the user communication device 60 as part of the user registration confirmation sent in S16, or a previous transaction response sent is step S29. In case of the very first transaction the service request validator received in the secure element service request S20 is the service request validator that was sent to the user communication device 60 during the registration procedure in step S16. In case of all further transactions the service request validator received in the secure element service request in step S20 is the service request validator that was sent to the user communication device 60 during the previous transaction in step S29.

The service request validator may contain a unique identifier, which may be a one-time password specifically sent to the user communication device 60 for use in a subsequent secure element service request. The service request validator may be generated by the server application 14 on the cloud server 10 or the secure element application 34 assigned to the user account 16 or jointly by the server application 14 on the server 10 and the assigned secure element application 34. The service request validator is preferably routed to the user communication device 60 through a second electronic communication channel 82 differing from a first electronic communication channel 81 through which the secure element service request or the registration request is received by the cloud server 10. According to an embodiment, the second communication channel is the PUSH communication channel 82 illustrated in FIGS. 1a and 1b and the service request validator is sent in a mobile push message. Alternatively, the service request could be sent in an SMS, an e-mail, a chat message or in any other electronic means which is directly addressable to the user, its device or applications through a corresponding second electronic communication channel. However, it is also conceivable to use the same, already opened electronic communication channel 81 for sending the service request validator through which the secure element service request or the registration request is received by the cloud server 10.

According to an embodiment, the service request validator is regenerated by the entity which originally created it, i.e. the service request validator is regenerated by the server application 14 on the cloud server 10 or the secure element application 34 assigned to the user account 16 or jointly by the server application 14 on the server 10 and the assigned secure element application 34, respectively, after which the received service request validator and the regenerated service request validator are compared. According to another embodiment the service request validator is stored in the cloud computing environment 100, optionally in the secure element application 34 once it has been generated, in which case it is not necessary to regenerate the service request validator during the subsequent transaction, it is sufficient to retrieve the stored service request validator and compare it with the service request validator received in the secure element service request. Validation of the service request validator may be performed by the server application 14 on the cloud server 10 or in the secure element application 34 assigned to the user account 16. Preferably, the service request validator is validated at the place of regeneration or retrieval from a storage.

If the received and the regenerated or stored service request validator are identical, then the service request is valid, which is preferably a precondition for performing the requested secure element service. Performance of the requested secure element service may be further conditional on authenticating the user as will be explained in more details, though the validation of the service request validator may also serve the purpose of user authentication.

The service request validator may be a unique ID (unique identifying data, e.g. a unique number and/or character series), or a hash of the unique ID, or a combination of multiple data elements (e.g. username, CIN, AID, etc.) with the unique ID, or a hash of the combination of the multiple data elements with the unique ID.

The secure element service request may further contain a personal identification data (PID) 73 of the user, in which case the user is authenticated based on the PID 73 before providing the requested secure element service. The PID 73 may be a PIN (personal identification number and/or character series) or biometric identification data (such as fingerprint, face photo, handwriting, etc.) or other personal data of the user (e.g. date of birth, address, passport number, tax number, etc.).

Authenticating the user based on the PID 73 may be performed by the server application 14 on the cloud server 10 e.g. together with the step S22 of identifying the user account 16. In this case the received PID 73 may be compared with a PID 73 previously stored in the user account 16 or a hash thereof. Preferably the stored PID 73 is received by the server application 14 on the cloud server 10 during the registration process, preferably as part of the registration request in step S10. Alternatively, the authentication may take place in the secure element application 34 assigned to the user account 16 of the user during the step S28 of processing the secure element service request. In this case the PID 73 received during the registration process is preferably transmitted to the secure element application 34 assigned to the user account 16 and it is stored therein. During step S28 the secure element application 34 may compare the received PID 73 with the PID 73 or their hashes previously stored therein.

Figure 2C:
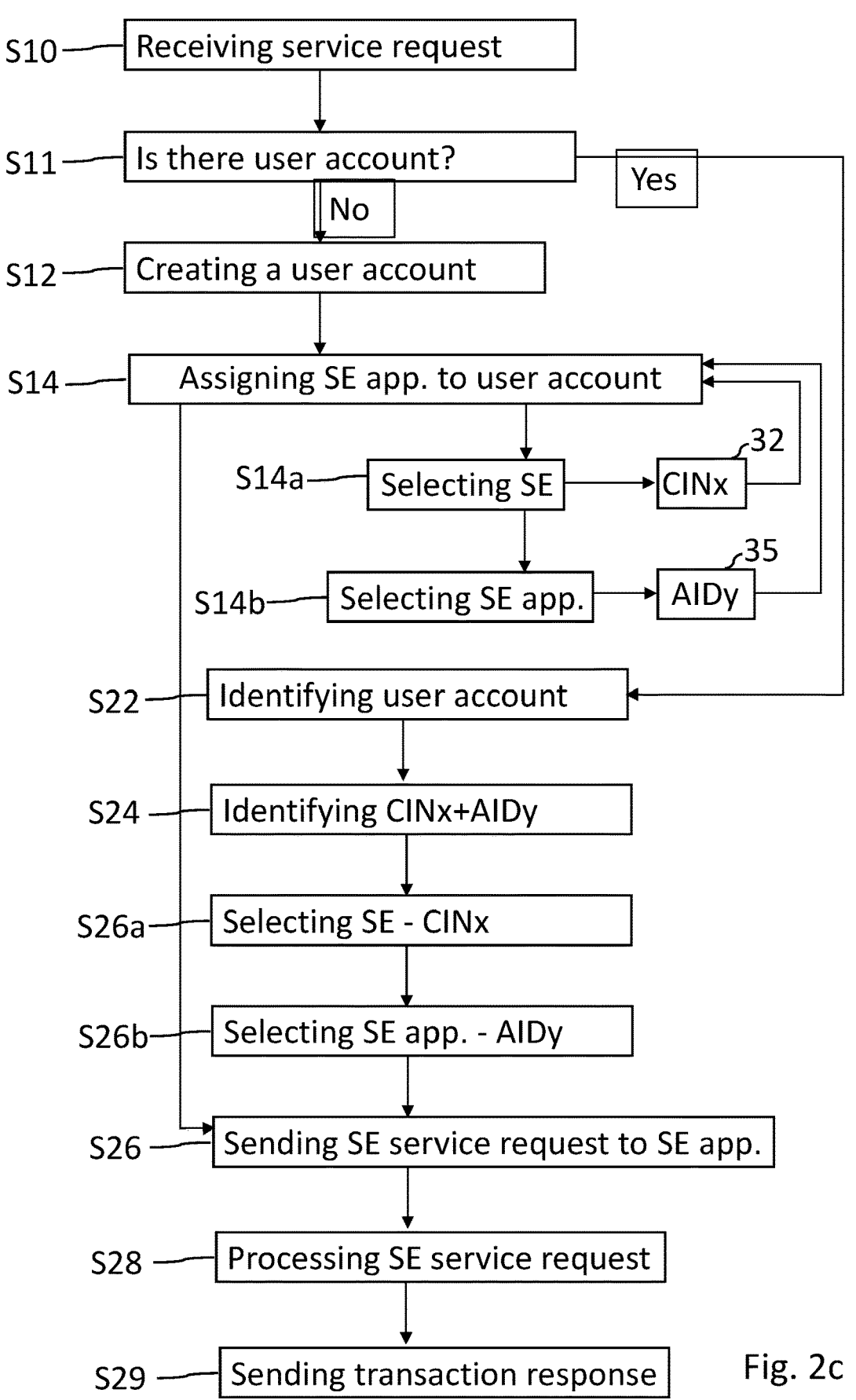
FIG. 2c is a schematic flow diagram for a combined registration process and provision of an SE service according to another preferred embodiment of the method according to the invention.

The flow diagram of FIG. 2c shows the basic steps of another embodiment of the method according to the invention wherein the steps indicated in FIGS. 2a and 2b are combined in order to avoid the necessity of a separate registration request. In this case a new user may start by sending a service request without having to register in advance. The service request is received in step S10 and in step S11 the cloud server 10 checks whether or not a user account 16 has already been created for the given user. This may be verified e.g. by checking the username 72 or the RegID 71 contained in the service request or any other user specific data that should be found in the database 15 if the user account 16 already exists. If the result is positive, then the steps S22 to S29 of executing the service request are performed in accordance with FIG. 2a. If the result is negative, then the steps S12, S14, S14a, S14b of the registration are first performed in accordance with FIG. 2b, after which the process is continued by executing the steps S26 to S29 of executing the service request. In this case the transaction response sent in step S29 may take the place of the registration confirmation and may contain all data that would be sent in the registration confirmation message described in connection with FIG. 2a. It is also conceivable to send a separate registration confirmation message in addition to the transaction response.

Figure 3A:
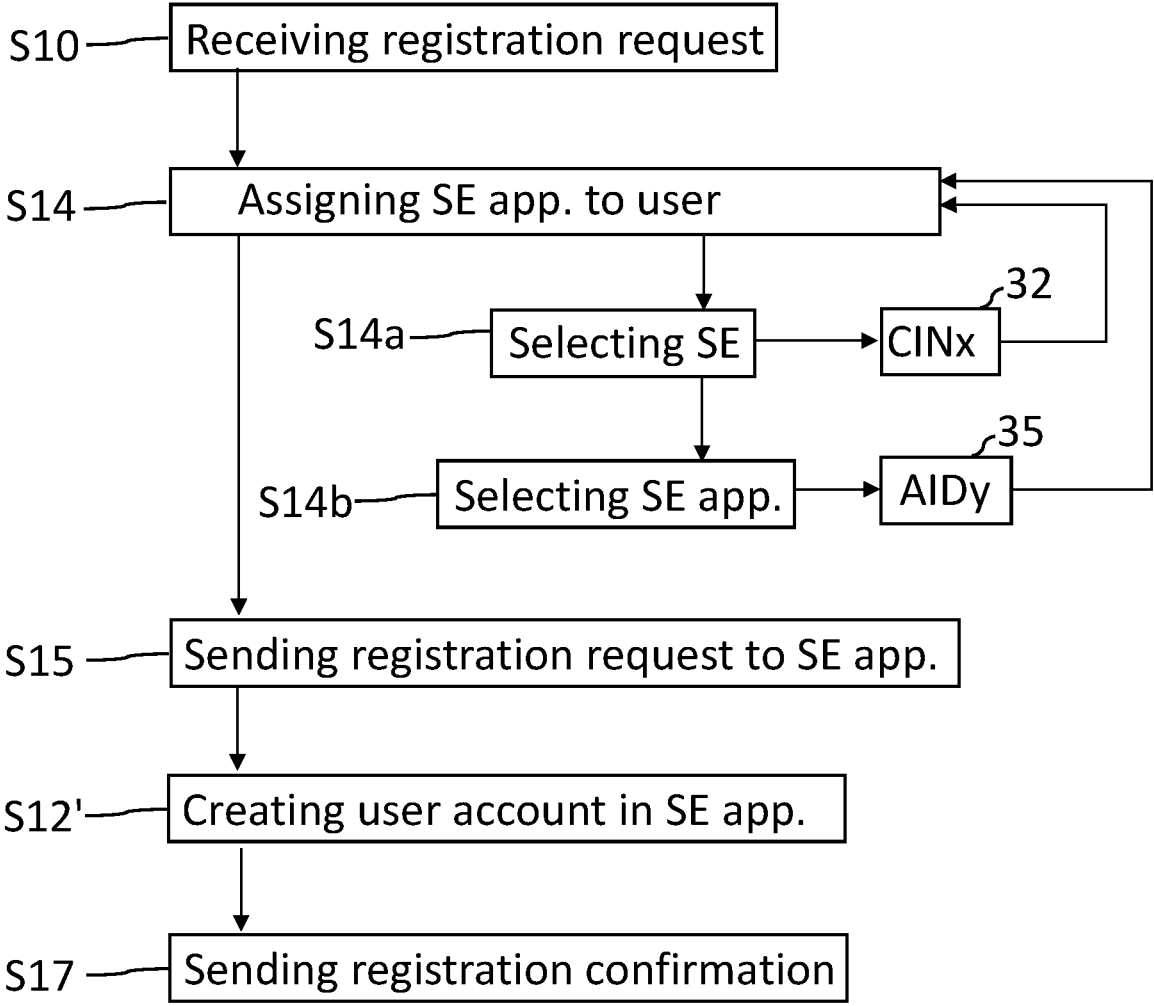
FIG. 3a is a schematic flow diagram for a registration process according to a further preferred embodiment of the method according to the invention.
Figure 3B:
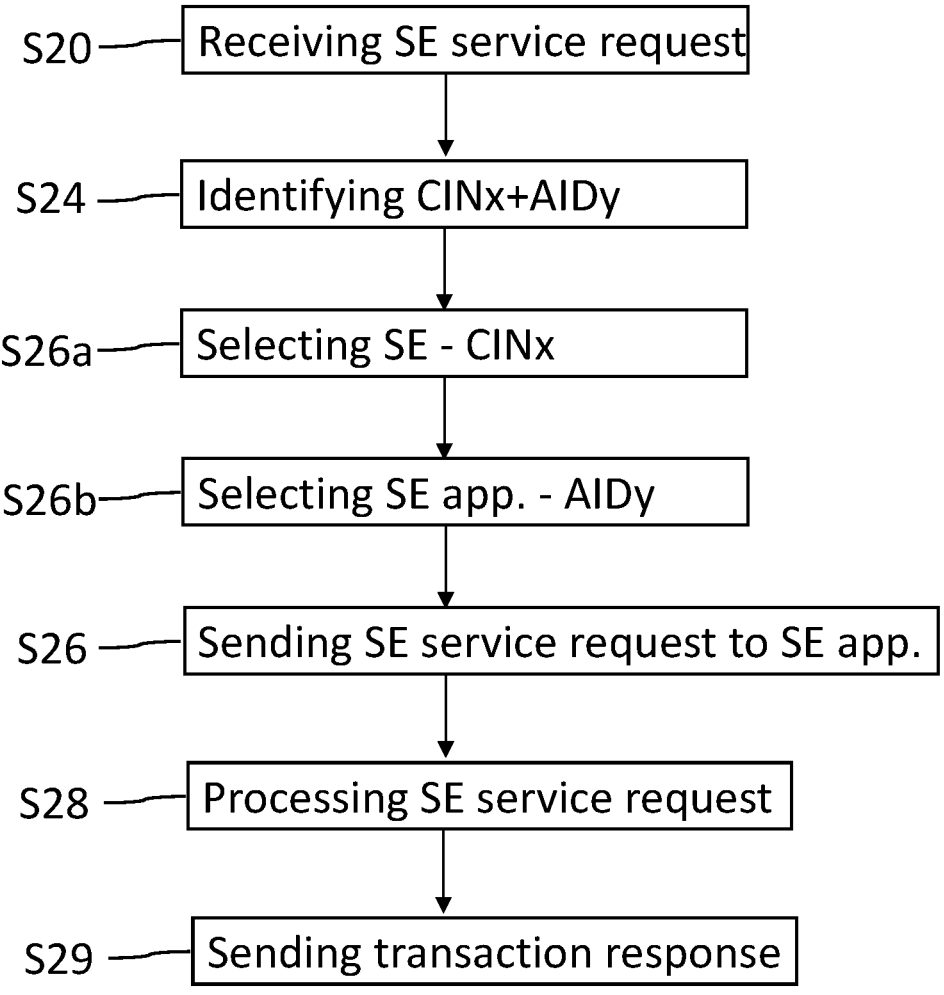
FIG. 3b is a schematic flow diagram for providing an SE service according to a further preferred embodiment of the method according to the invention.

The flow diagrams of FIGS. 3a and 3b show the basic steps of a further embodiment of the method according to the invention which can be performed e.g. by the cloud computing environment 100 illustrated in FIG. 1c or FIG. 1d.

For the sake of simplicity, the same or corresponding steps are referred to by the same reference numerals as in case of FIGS. 2a and 2b.

The method illustrated in FIG. 3a is very similar to the method described in connection with FIG. 2a. The main difference being that after receiving the registration request by the server 10 from the user communication device 60 in step S10 the server application 14 does not create the user account 16, instead it merely assigns a secure element application 34 to the user in step 14 by selecting an available secure element 30 with an available secure element application 34 thereon. According to a preferred embodiment the database 15 is used to store a look-up table or list indicating the CIN 32 and AID 35 of the available (unassigned) secure element applications 34. When a given user application 34 on a given secure element 30 is assigned to the user requesting registration the corresponding CINx 32 and AIDy 35 pair is marked as unavailable in the data base 15.

In step S15 the server application 14 transmits the registration request to the SE application 34 assigned to the user, which, in turn, creates the user account 16 in step S12'. After this, preferably a registration confirmation is sent back to the user communication device 60. This may be carried out by generating and returning a registration confirmation response by the SE application 34 to the server application 14 over the third communication channel 83 and transmitting the registration confirmation from the server 10 to the user communication device 60 and to its user application 64 with either the same or modified content.

Once the user has been successfully registered the cloud computing environment can provide a secure element service for the user. The steps of providing the secure element service are illustrated in FIG. 3b.

The method illustrated in FIG. 3b is very similar to the method described in connection with FIG. 2b, hence only the differences will be highlighted herein.

Once the service request is received by the server application 14 in step S20 the CINx 32 and the AIDy 35 of the particular SE application 34 assigned to the user is identified by the server application 14 in step S24. According to a particularly preferred embodiment, the CINx 32 and the AIDy 35 of the SE application 34 assigned to the user is contained in the service request and the server application 14 selects the given secure element 30 and the given SE application 34 based on the content of the service request in steps S26a and S26b. From hereon the process is carried out similarly to what has been described in connection with FIG. 2b.

Figure 3C:
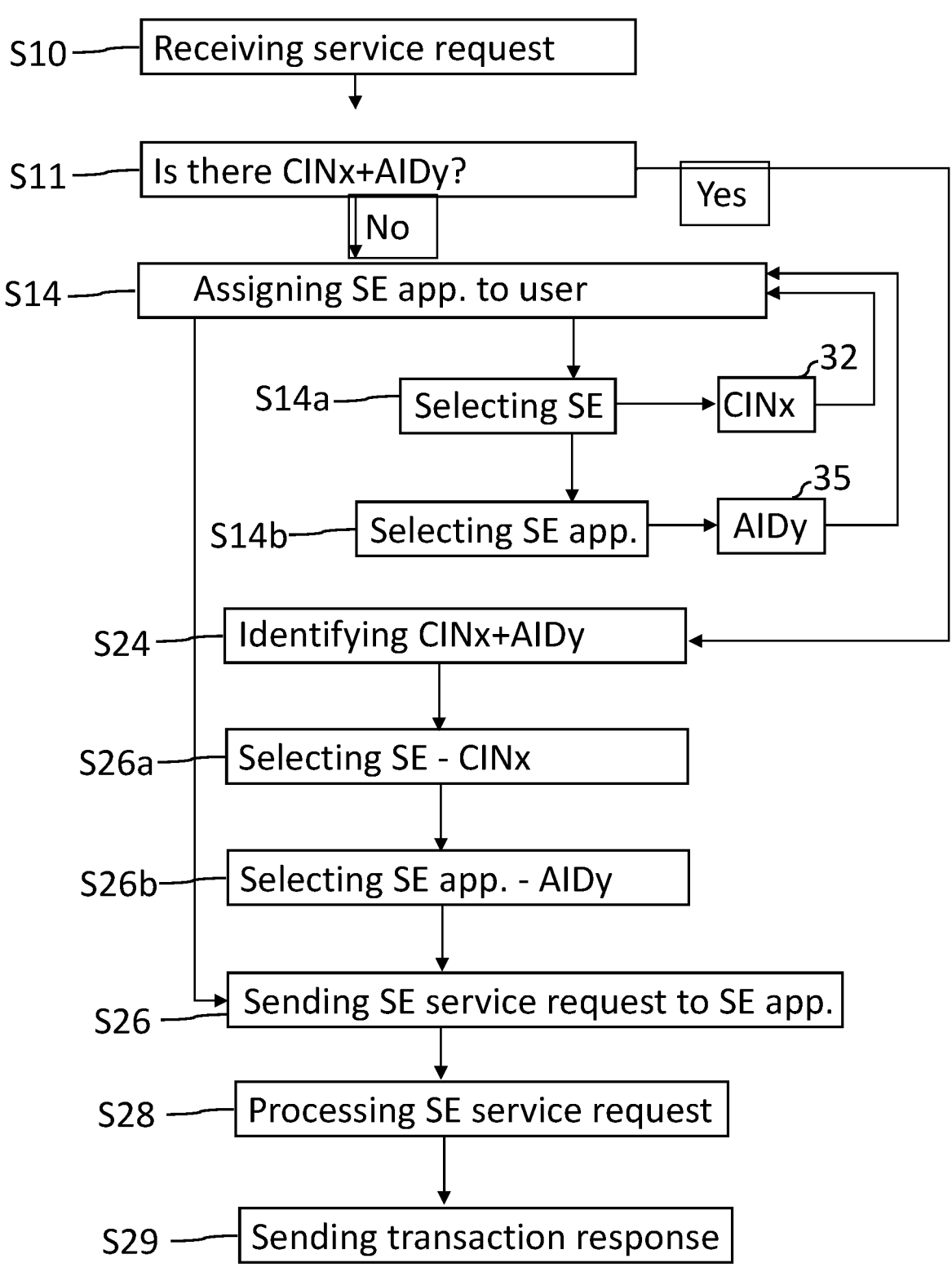
FIG. 3c is a schematic flow diagram for a combined registration process and provision of an SE service according to a further preferred embodiment of the method according to the invention.

The flow diagram of FIG. 3c shows the basic steps of another embodiment of the method according to the invention wherein the steps indicated in FIGS. 3a and 3b are combined in order to avoid the necessity of a separate registration request, similarly to the embodiment depicted in FIG. 2c. The present embodiment differs from the embodiment depicted in FIG. 2c in that the server verifies in step S11' if there is a CINx 32 and AIDy 35 contained in the service request and assigns a secure element application 34 to the user if not. From hereon the process is carried out similarly to what has been described in connection with FIG. 2c.

Figure 4A:
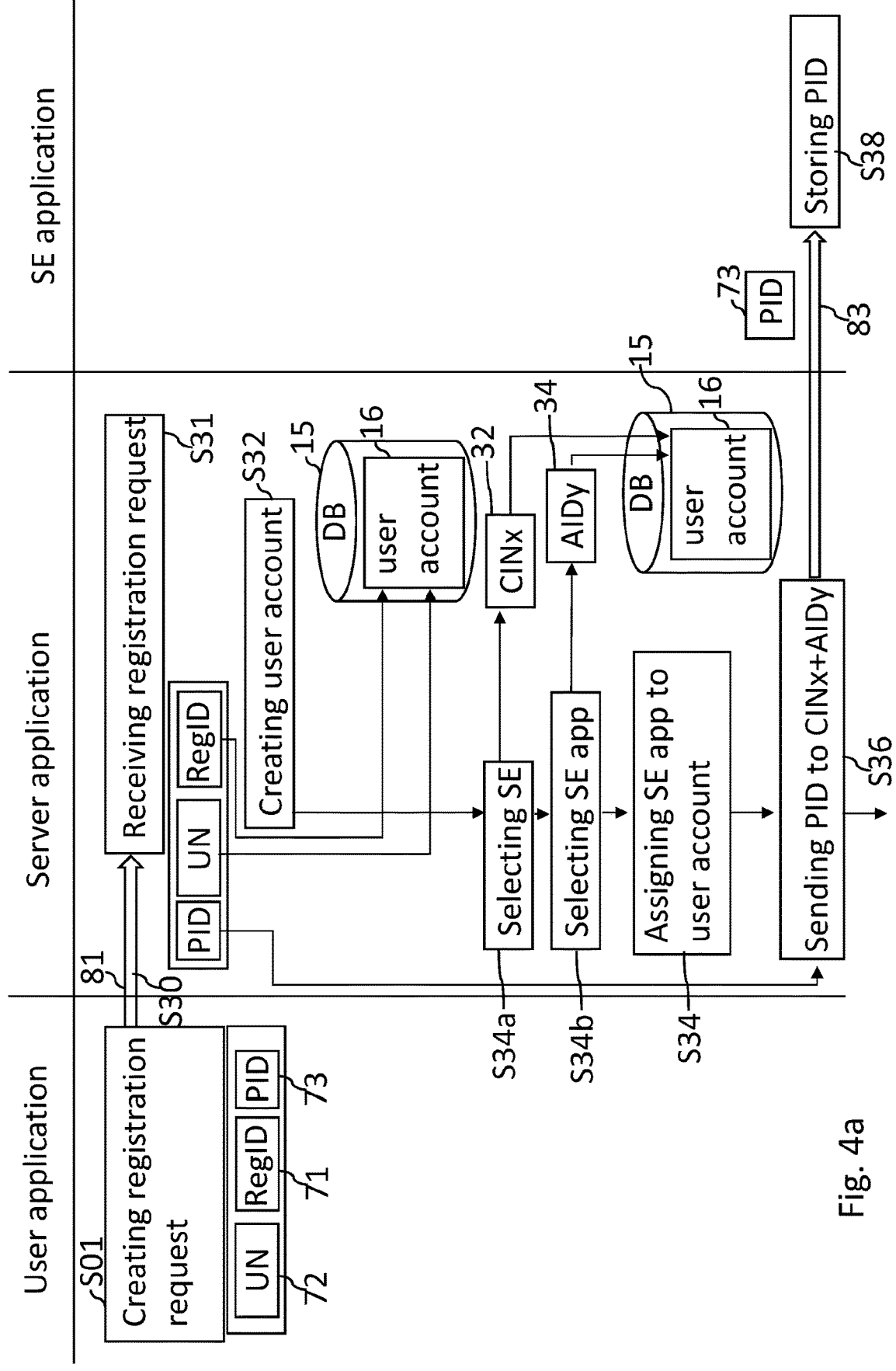
FIGS. 4a and 4b together show a schematic flow diagram for a registration process according to another preferred embodiment of the method according to the invention.
Figure 4B:
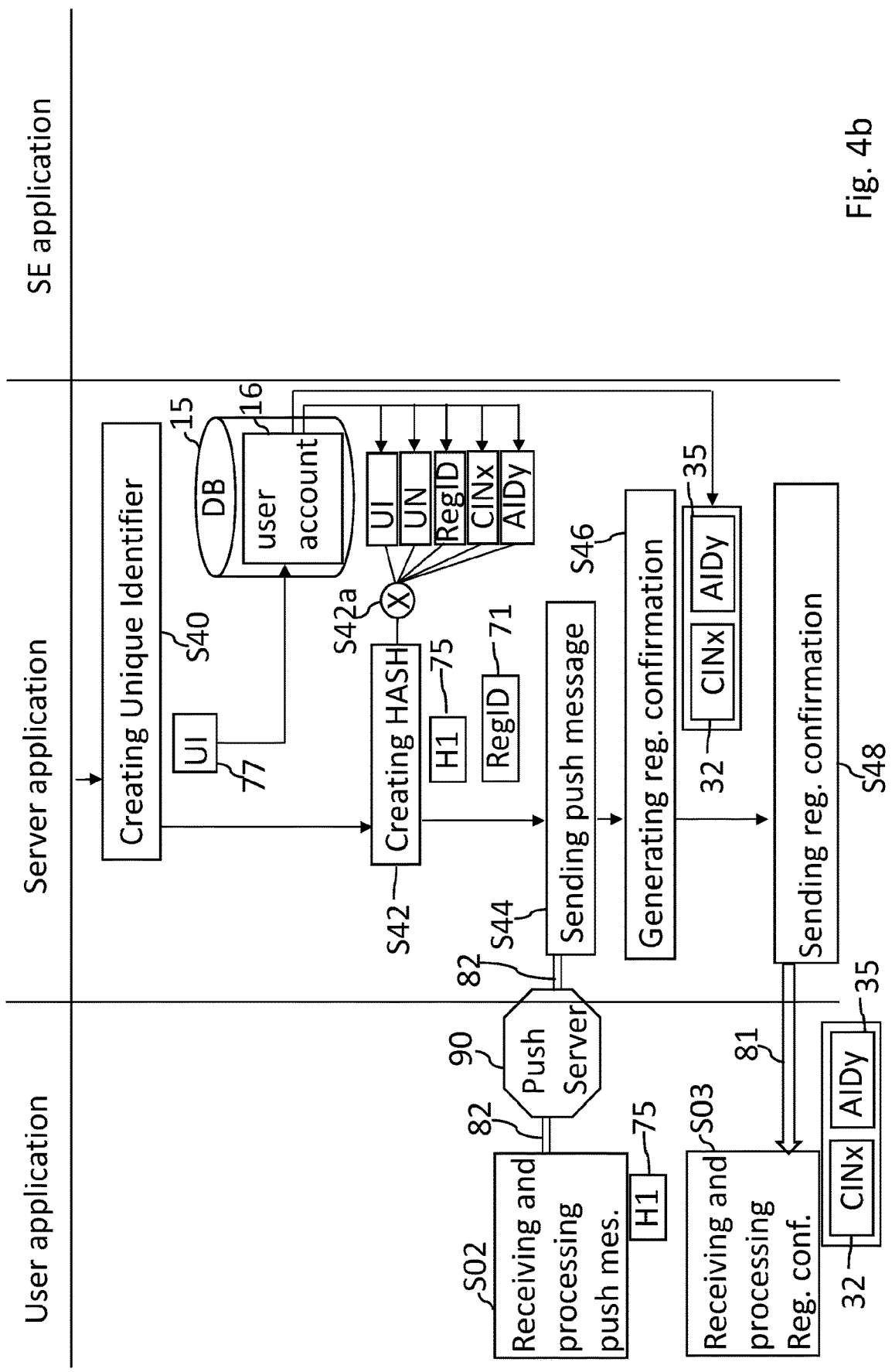
Figure 5A:
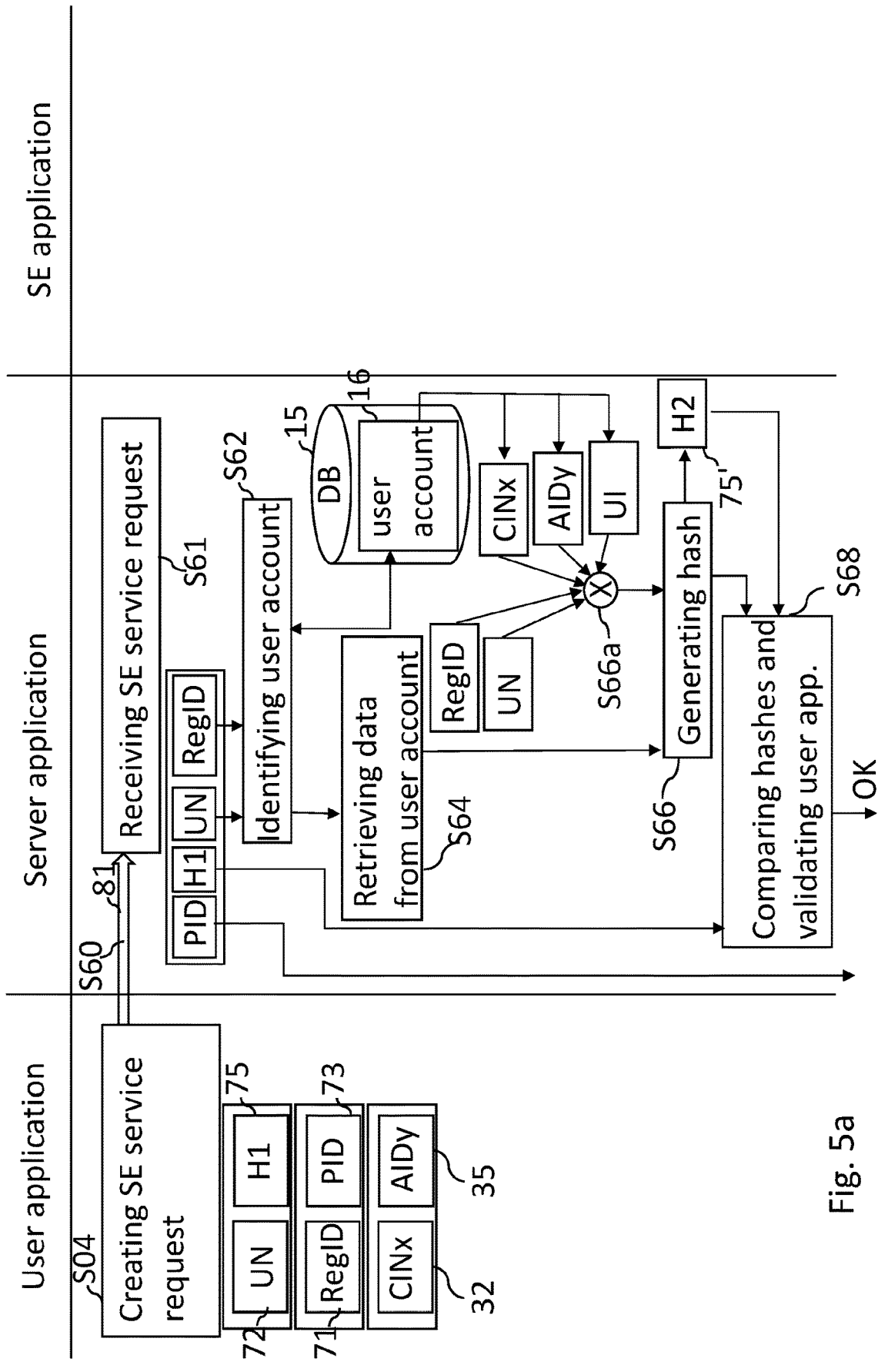
FIGS. 5a and 5b together show a schematic flow diagram for providing an SE service according to another preferred embodiment of the method according to the invention.
Figure 5B:
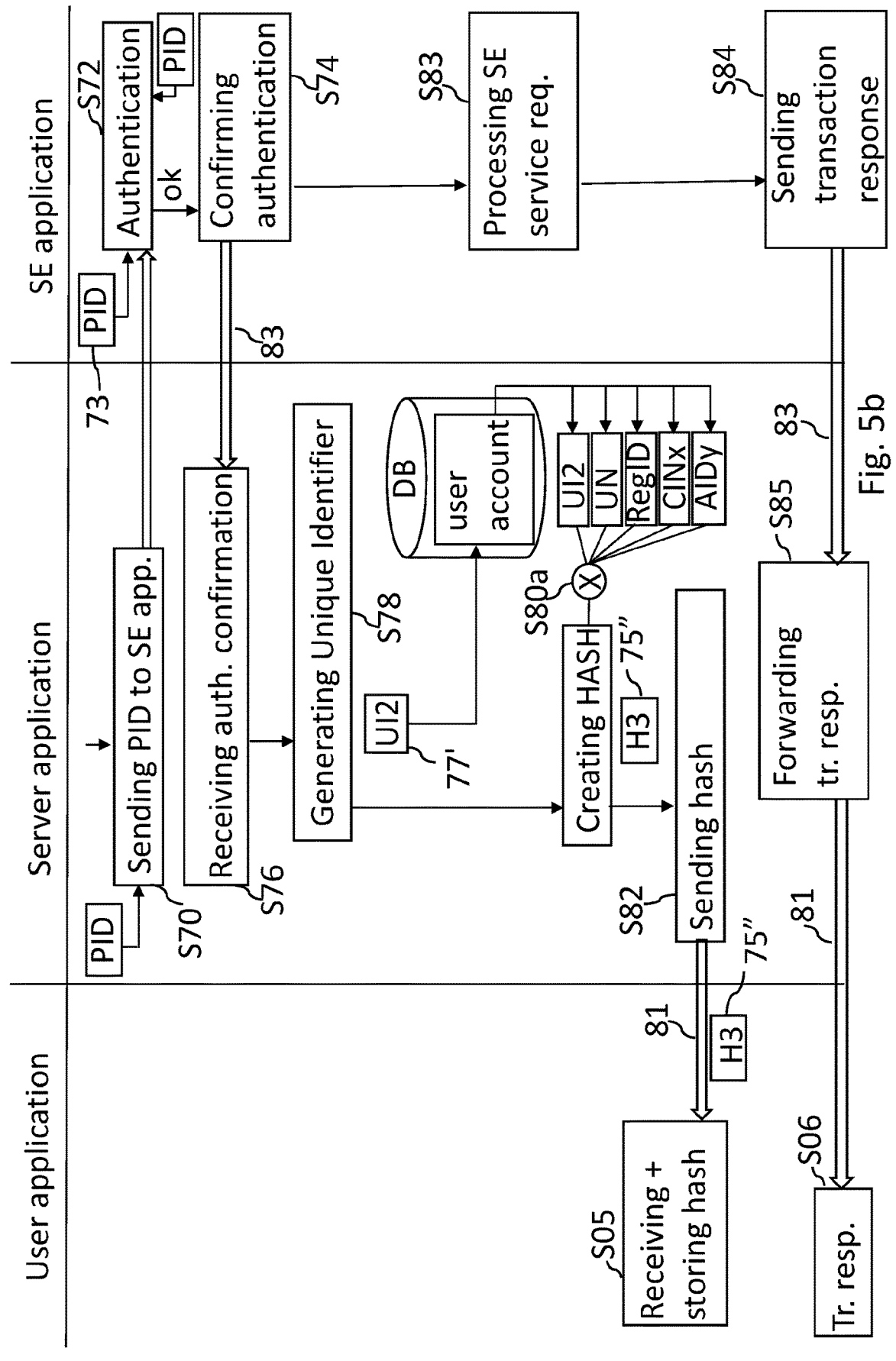

A particularly preferred embodiment of the method according to the invention is illustrated in FIGS. 4a, 4b, 5a and 5b which can be performed e.g. by the cloud computing environment 100 illustrated in FIGS. 1a and 1b. FIGS. 4a and 4b show the steps of registering a user and FIGS. 5a and 5b show the steps of providing a secure element service to the registered user.

The steps performed by the user via his or her user communication device 60 are not necessarily part of the method according to the invention, however, for the sake of completeness these steps are described briefly as well. In step S01 the user application 64 of the communication device 60 creates a registration request containing at least the identifier (InstanceID or RegID) 71 of the user application 64, the username (UN) 72 and a personal identification data (PID) 73 of the user. The latter may be a PIN (personal identification number or other characters) and/or a biometric identification data (e.g. fingerprint, face photo, handwriting, etc.) and/or data extracted from such biometric identification data (e.g. feature points of the biometric identification data) or any other data producible only by the user. The RegID 71 is obtained by the user application 64 through a specific API provided for this purpose while the username 72 and the PID 73 are inputted by the user through the one or more input interface 65 of the user communication device 60. If the PID contains biometric identification data the input interface 65 comprises appropriate biometric identification data reader and/or software (e.g. fingerprint reader, camera, signature pad, etc.) The username 72 may even be stored in the user communication device 60 but the PID 73 should preferably be input by the user for each transaction.

In step S30 the electronic communication channel 81 is established over the Internet between the server 10 (in particular the server application 14) of the cloud computing environment 100 and the user application 64 of the remote user communication device 60 over which the user application 64 sends the registration request.

In step S31 the registration request is received by the server application 14 on the server 10.

In step S32 a user account 16 is created in response to the registration request. This includes storing at least the username 72 in the data base 15 for the currently created user account 16. Preferably the RegID 71 is also stored for the user account 16.

In step S34 an available secure element application 34 on one of the secure elements 30 is assigned to the user account 16. According to the embodiment illustrated in FIG. 4a this is carried out by selecting a secure element 30 in step S34a, which has a secure element identifier CINx 32 and saving the CINx 32 in the data base 15 for the user account 16. In step S34b a secure element application 34 is selected on the selected secure element 30 and its AIDy 35 is also stored in the data base 15 for the currently created user account 16.

In step S36 the PID 73 is sent to the secure element application 34 which is identified by the CINx 32 and AIDy 35 stored for the user account 16. The PID 73 may be sent separately or included in a data package containing other data as well, e.g. technical settings data for personalizing the secure element application 34. The transmission of the PID 73 takes place over the local communication channel 83 established between the secure element reader interface 13 of the server 10 and the secure element reader 50 which is connected to the selected secure element 30. Known card management protocols may be used for addressing and communicating with the secure element 30 and the secure element application 34 running thereon.

In step S38 the secure element application 34 identified by AIDy 35 receives and stores the PID 73.

Alternatively, steps S36 and S38 may be omitted, in which case the PID 73 is stored in the data base 15 for the currently created user account 16 together with the username 72 and RegID 71 in step S32.

In an alternative implementation it is also possible that the PID 73 is not part at all of the registration request but is used locally by the user application 64 in the user device 60 for providing access to the user application 64 for the user.

In step S40 the server application 14 running on the cloud server 10 generates a unique ID (UI) 77 and stores it in the data base 15 for the user account 16.

In the present embodiment the unique ID 77 is first concatenated with the RegID 71 of the user application 64, the username 72, the CINx 32 and AIDy 35 in step S42*a*. It is also conceivable to concatenate only one or some of the aforementioned data with the unique ID 77.

In the present embodiment the unique ID 77 is used to generate a one-time-password comprising multiple components, however, it would also be possible to use only the unique ID 77 itself as the one-time password.

In step S42 the server application 14 generates a first cryptographic hash (H1) 75 from the concatenated data containing the unique ID 77, the RegID 71 of the user application 64, the username 72, the CINx 32 and AIDy 35.

In a more secure cloud computing environment 100 the unique ID (UI) 77 can rather be generated by the secure element application 34 assigned to the user account 16, and it may also generate the hash (H1) 75 comprising multiple data elements as described above.

A hash is a compressed data package created by a hash generator algorithm (such as SHA-3 released by NIST) from the digital data, and from which it is impossible to reconstruct the original digital data. A unique feature of hash-generating algorithms is that changing any part of the original digital data produces an avalanche-like effect in the hash, due to which it completely changes. As a result, re-generating the hash is suitable for checking if any change has been made in the digital data, in other words it is suitable for ensuring the integrity of the original digital data.

The hash 75 is then transmitted to the user application 64 in step S44 in a mobile push message over the PUSH communication channel 82 with the help of the external push server 90 using the RegID 71 for addressing the user application 64. The use of a push message provides extra security layer by using a logical communication channel (referred to as PUSH communication channel in the present specification) over the internet that is different than the electronic communication channel 81 established between the user application 64 of the user communication device 60 and the server application 14 of the cloud server 10. Moreover, the mobile push message is necessarily sent to the user application 64 of which the RegID 71 was contained in the registration request. Such an association assures that response is sent to the actual user who claims to be the registrant.

The user application 64 receives the mobile push message in step S02 and stores the first hash 75, which will be used as a one-time password in a subsequent transaction as will be explained in more detail in connection with FIGS. 5*a* and 5*b*.

Optionally in step S46 a registration confirmation message may also be generated, which may include the CINx 32 and AIDx 35 identifying the secure element application 34 assigned to the user account 16. The registration confirmation message is then transmitted in step S48 from the server application 14 on the server 10 to the user application 64 of the user communication device 60 over the electronic communication channel 81 which is still open.

In step S03 the registration confirmation message is received and processed by the user application 64. The registration confirmation message confirms that the registration process has been completed, though the push message alone, received in step S2, may also satisfy this purpose.

After this the electronic communication channel 81 can be closed.

The steps of providing a secure element service by the secure element application 34 are illustrated in the flow diagram of FIGS. 5*a* and 5*b*.

The steps performed by the user via his or her user communication device 60 are not necessarily part of the method according to the invention, however, for the sake of completeness these steps are described briefly as well. In step S04 the user application 64 of the communication device 60 creates a secure element service request containing at least the username 72, and the first hash 75 previously sent by the server application 14 of the cloud server 10. The PID 73 may be sent together with the username 72 and the hash 75 in the same message or may also be sent separately for security purposes after a direct communication channel has been established between the user application 64 and the assigned secure element application 34 of the user account 16 via the server application 14 on the cloud server 10 acting as a proxy. The username 72 and the first hash 75 may be stored in the user application 64, however, preferably the user is required to input the PID 73 through the appropriate user interface 65 as explained in connection with step S01. Preferably, the service request further contains the RegID 71 of the user application 64. Optionally the CINx 32 and the AIDy 35 identifying the secure element application 34 assigned to the user account 16 of the user may also be included in the service request. Any additional data included in the secure element service request for authentication purposes beside the hash 75 is completely implementation dependent. The secure element service request may further contain transaction data for performing the requested secure element service in the same or in a separate message.

In step S60 the electronic communication channel 81 is established again between the remote client communication device 60 and the cloud server 10 over the Internet. In step S61 the secure element service request is received by the server application 14 over the electronic communication 81 channel.

In step S62 the user account 16 is identified based on the contents of the secure element service request. For example, the username 72 received in the service request can be used to identify the user account 16 stored in the data base 15 which contains the same stored username 72. In case the RegID 71 is also received in the service request the RegID 71 may also serve to identify the corresponding user account 16 or in another configuration any of these two data elements (username 72+RegID 71) in combination or alone identify the user account 16. Once the user account 16 has been identified the corresponding CINx 32 and AIDy 35 can be retrieved from the data base 15 and the secure element application 34 assigned to said user account 16 can be identified as well.

In step S64 the data required to generate the first hash 75 is retrieved for the identified user account 16 from the data base 15. This includes retrieving at least the unique identifier 77 stored for the identified user account 16. In case the original hash 75 was generated from the unique identifier 77 and one or more other stored data concatenated with the unique identifier 77 then, according to a preferred embodiment, all the other data used to generate the original hash 75 are also retrieved from the data base 15 and used to generate a second hash (H2) 75' in step S66, using the same method as the first hash was generated. According to another possible embodiment the second hash 75' may be generated using the unique identifier 77 retrieved from the data base 15 and the data received in the secure element service request in step S04, which could be the RegID 71, the username 72, the CINx 32 and the AIDy 35 as illustrated in FIG. 5a. It is also a suitable solution if the hash 75 itself is stored in the data base 15 for the identified user account 16 in which case it does not need to be regenerated only retrieved.

In step S68 the secure element service request is validated by comparing the received hash 75 with the newly generated or retrieved hash 75'. In case of correspondence at least the PID 73 is transmitted to the assigned secure element application 34 over the communication channel 83 between the SE reader interface 13 of the server 10 and the chip card reader 50.

In S72 the user is authenticated by the secure element application 34 based on the stored and the received personal identification data 73. In case of correspondence between the received and the stored PID 73, the authentication is successful, and an authentication confirmation response may be generated and sent by the secure element application in step S74. The authentication confirmation is received by the server application 14 of the server 10 in step S76. If the received and stored PID 73 do not correspond, then the authentication confirmation response preferably contains information about the unsuccessful authentication. In case of successful authentication, the steps S74 and S76 of authentication confirmation are completely optional as the process may directly continue with the processing of the secure element service request in step S83.

After successful authentication the assigned secure element application 34 processes the secure element service request in step S83 and provides the requested secure element service in step S84 in the form of a transaction response. For example in case the secure element service request is directed to obtaining a certificate or other data stored in secure element application 34 of the secure element 30 this may be sent to the user application 64 in the transaction response over the third communication channel 83 to the server application 14 and from there after the necessary transformation over the first communication channel 81 to the user application 64, which receives the transaction response (e.g. the certificate or other data) in step S06. Other type of transactions are conceivable as well, e.g. the service request may be directed to authenticating the user vis-a-vis a third party in case of which the transaction response is the authentication response (authentication confirmed or failed), which may be sent to a third party from the secure element application 34 using the server application 14 running on the cloud server 10. Another possible transaction is the signing of a data element sent by the user application 64 in a secure element service request to the secure element application 34 or providing signed authorisation for the user to execute service transactions based on the specific user credentials stored in the secure element application 34.

The provision of the requested secure element service may require other type of verifications at the secure element application 34. For example, the secure element service may be subject to given user credentials, in case of which the secure element application 34 verifies whether or not the authenticated user has been provided with the necessary user credentials required for obtaining the requested service.

It is noted that the secure element service request may be sent in more than one messages. In this case the messages are identified as belonging together by the server application 14 of the cloud server 10 either by their message IDs, session IDs, or based on the fact that they were using the same communication channel or by other technical means commonly used in communication management.

After successful authentication, either before, after or in parallel with providing the secure element service, the server application 14 of the server 10 generates and stores a new unique ID (UI2) 77' in step S78. and a third hash (H3) 75'' is generated therefrom in step S80 to be used as a one-time password in a subsequent secure element service request by the user application 64. As explained above, the unique identifier 77' may be concatenated in step S80a with other stored data before the third hash 75'' is generated therefrom. The third hash 75'' may be transmitted to the user communication device 60 over the first electronic communication channel 81 which is preferably still open separately from the transaction response in step S82 or as part of it in step S84, but it could also be sent in a mobile push message as described in connection with step S44. The third hash 75'' is received and stored by the user application 64 in step S05. The third hash 75'' is used similarly to the first hash 75 for validating the user request the next time that the user application 64 sends a secure element service request. It is noted that other type of one-time-password may also be used instead of the above described hash.

According to one implementation an asymmetric cryptographic key pair is provided of which a private key 76a is stored in the assigned secure element application 34. The key pair may be generated by the secure element application 34, and a public key 76b of the key pair may be transmitted from the secure element application 34 to the service application 14 as part of the registration process. The public key 76b of the key pair is transmitted to the user application 64 on the user communication device 60 over the first electronic communication channel 81 in step S48 before, together with or as part of the registration confirmation message. In the following the public key 76b is used for encrypting the personal identification data 73 of the user before including it in the service request message in step S04. In this way the PID 73 cannot be stolen even if the server 10 is compromised. In this case the server application 14 sends the encrypted PID 73 to the assigned secure element application 34 of the identified secure element 30 in steps S73 where it is decrypted with the private key 76a stored by the assigned secure element application 34.

According to another preferred embodiment the hash 75, 75', 75'' created in the cloud computing environment 100 is created in the assigned secure element application 34. This is done by transmitting the unique ID 77 or the concatenated data including the unique ID 77 to the assigned secure element application 34 and generating the hash 75, 75', 75'' therefrom in step S42, S66 and S80, respectively, by the secure element application 34. The hash 75, 75' and 75'' may then be transmitted back to the server application 14 of the cloud server 10, after which it is used as described earlier. In an even more secure approach the unique ID 77 to be hashed may also be generated by the secure element application 34 before the hash 75 is generated.

Figure 6A:
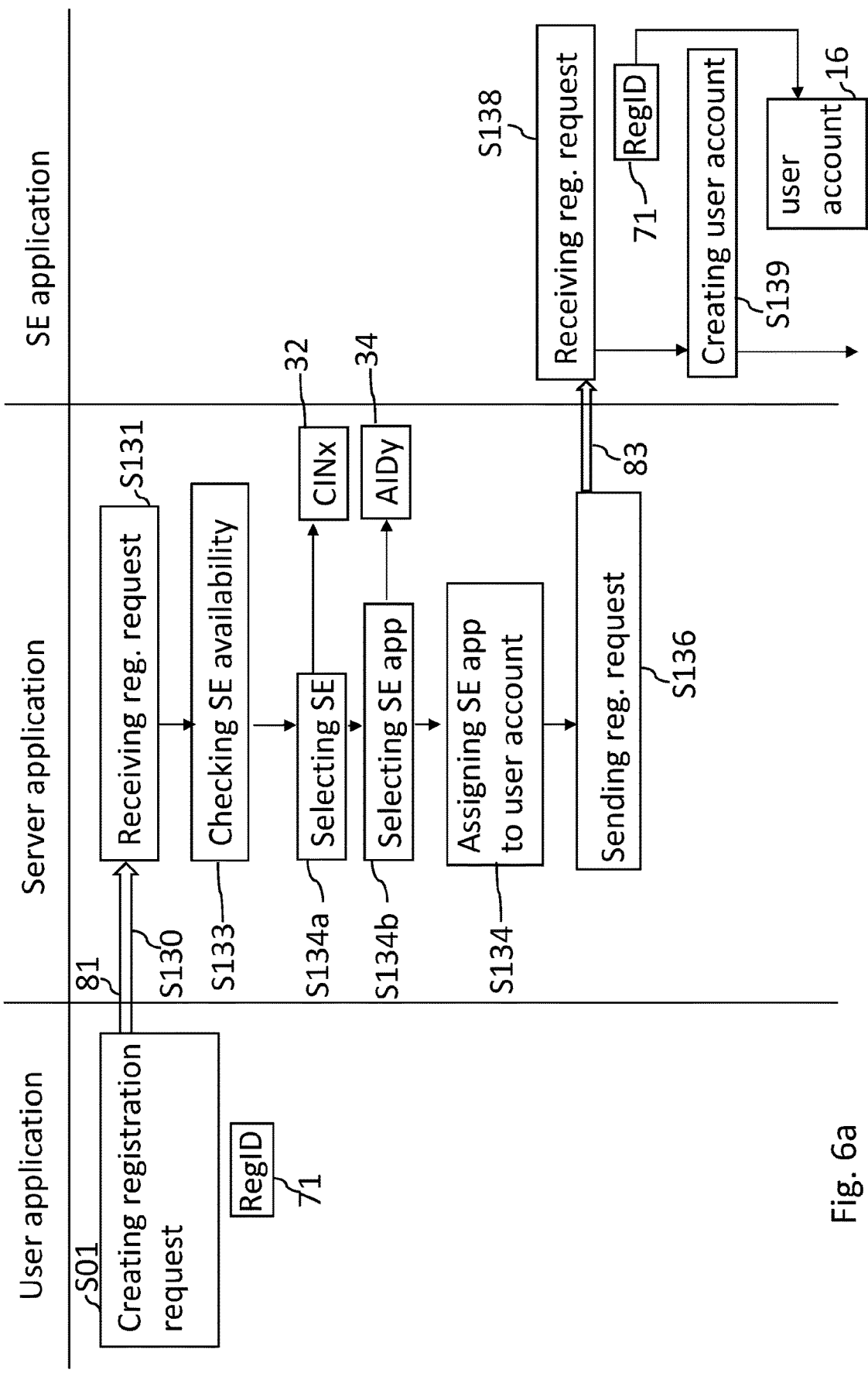
FIGS. 6a and 6b together show a schematic flow diagram for a registration process according to another preferred embodiment of the method according to the invention.
Figure 6B:
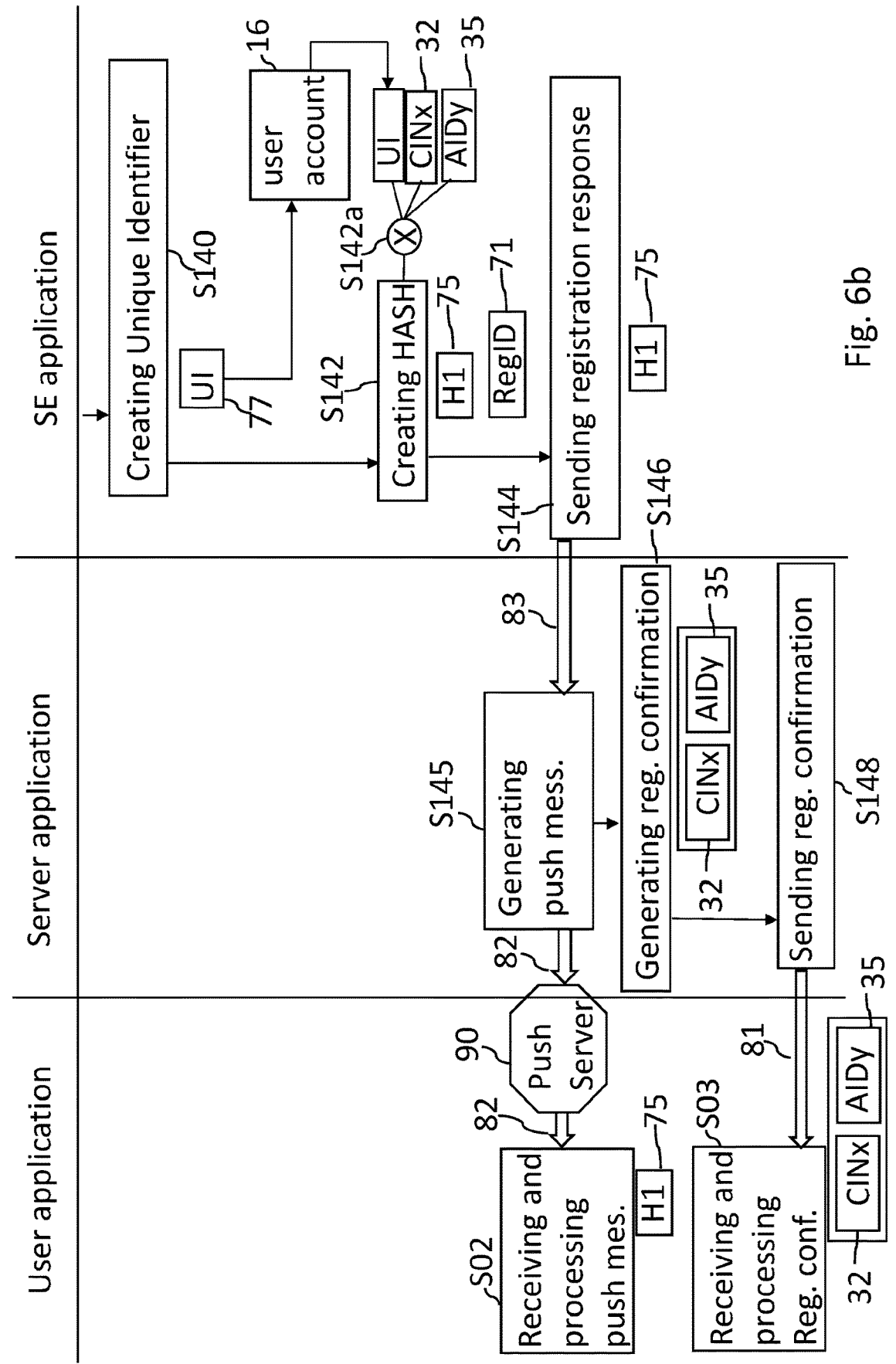
Figure 7A:
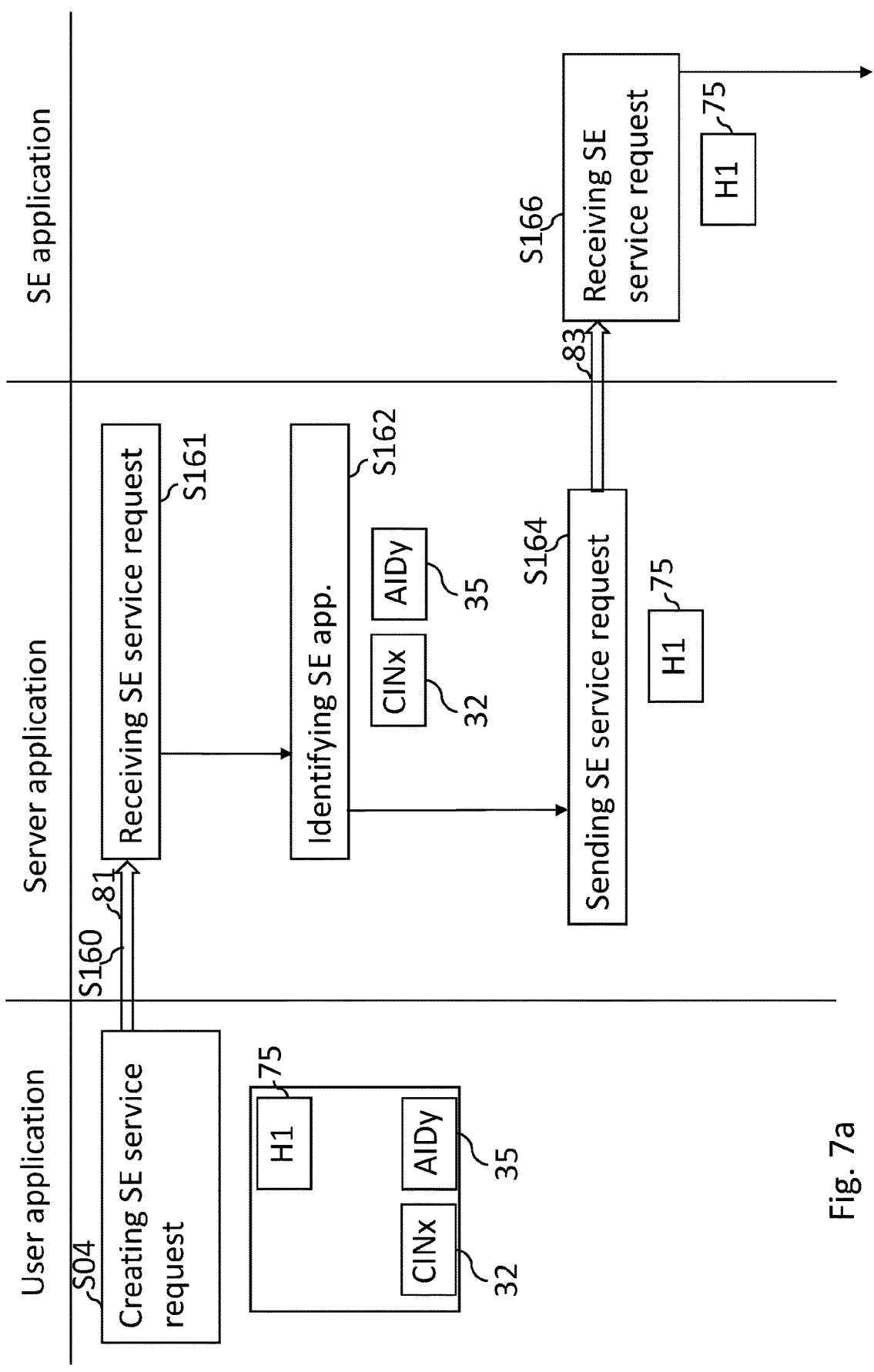
FIGS. 7a to 7c together show a schematic flow diagram for providing an SE service according to another preferred embodiment of the method according to the invention.
Figure 7B:
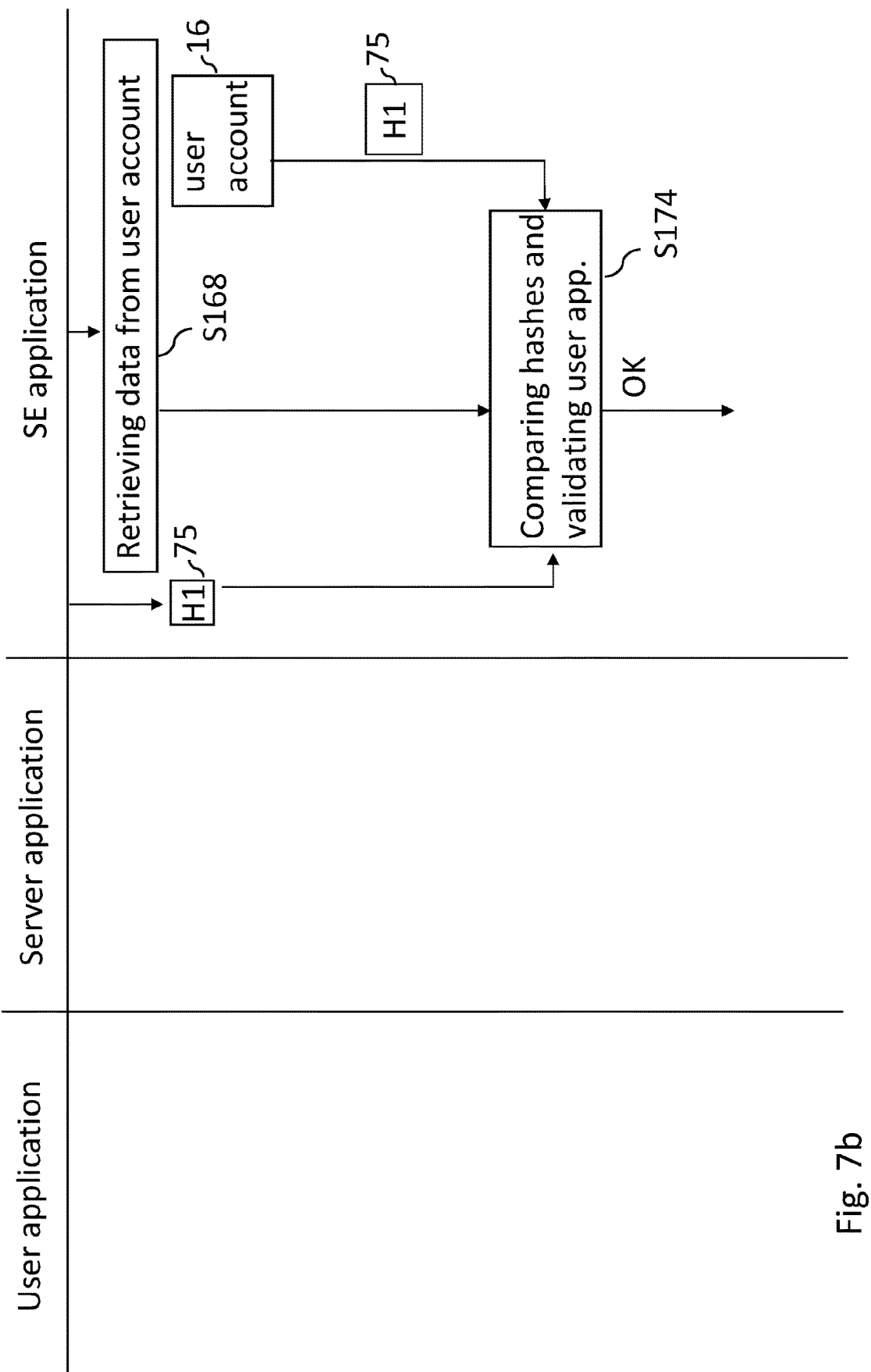
Figure 7C:
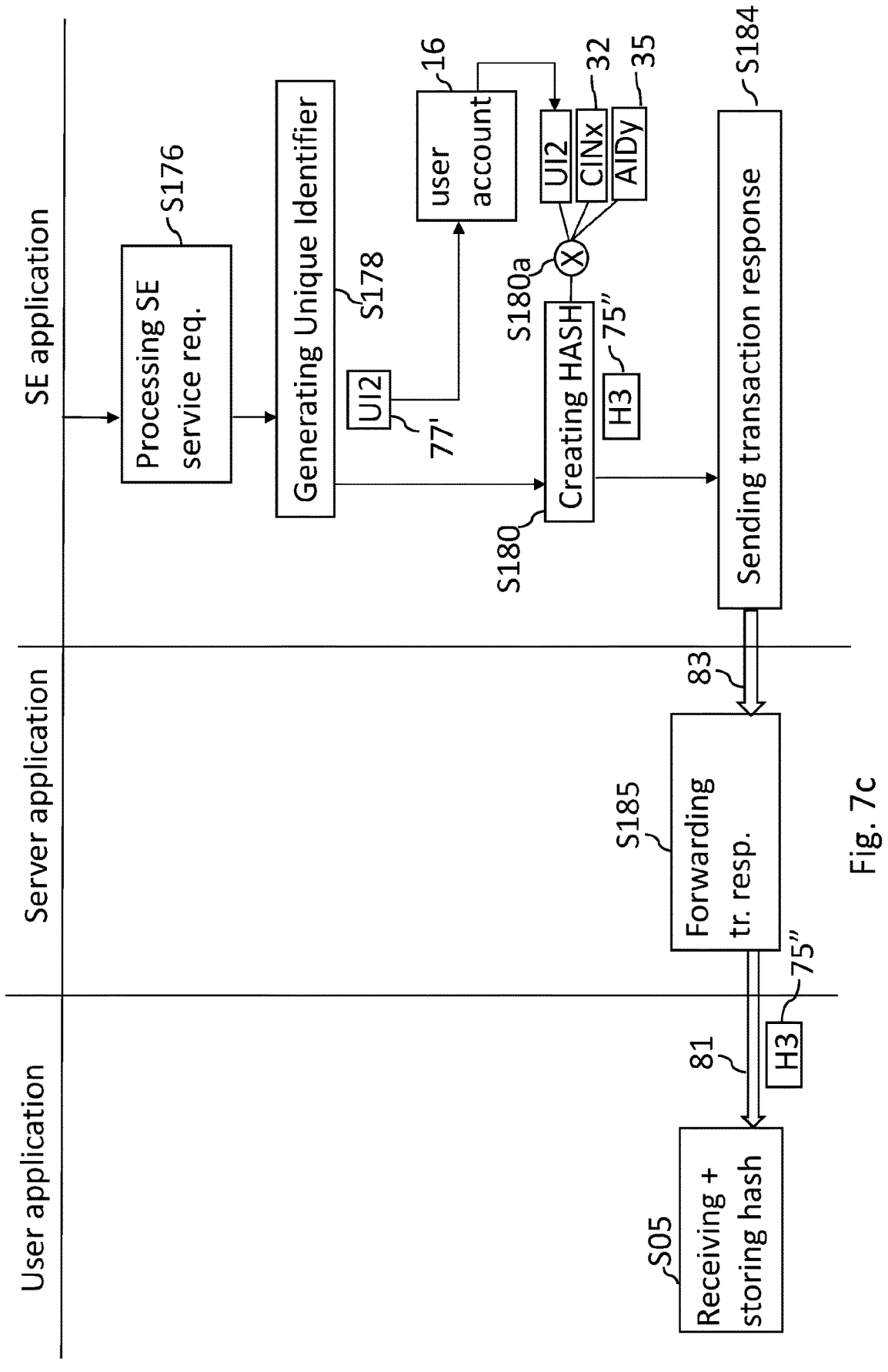

A particularly preferred embodiment of the method according to the invention is illustrated in FIGS. 6a, 6b, 7a, 7b and 7c which can be performed e.g. by the cloud computing environment 100 illustrated in FIGS. 1c and 1d. FIGS. 6a and 6b show the steps of registering a user and FIGS. 7a to 7c show the steps of providing a secure element service to the registered user.

The steps performed by the user via his or her user communication device 60 are referred to by the same reference numerals as in case of FIGS. 4a, 4b, 5a and 5b and are also not necessarily part of the method according to the invention, however, for the sake of completeness these steps are described briefly as well. In step S01 the user application 64 of the communication device 60 creates a registration request containing at least the identifier (InstanceID or RegID) 71 of the user application 64, which is the RegID 71 in the illustrated example.

In step S130 the electronic communication channel 81 is established over the Internet between the server 10 (in particular the server application 14) of the cloud computing environment 100 and the user application 64 of the remote user communication device 60 over which the user application 64 sends the registration request.

In step S131 the registration request is received by the server application 14 on the server 10.

In S133 the server application 14 checks the available secure elements 30 and secure element applications 34 thereon which have not been assigned to any user so far.

In step S134 an available secure element application 34 on one of the secure elements 30 is assigned to the user. According to the embodiment illustrated in FIG. 6a this is carried out by selecting a secure element 30 in step S134a, which has a secure element identifier CINx 32 and saving the CINx 32. In step S134b a secure element application 34 and its AIDy 35 is selected on the selected secure element 30. According to a preferred embodiment the step S134 of assigning the SE application 34 also includes marking the selected pair of CINx 32 and AIDy 35 as unavailable in the data base 15 which contains availability information of the secure element applications 34 within the cloud computing environment 100. The data base 15 need not contain any information relating to the user or the user communication device 60, it is sufficient to know whether or not an SE application 34 is still available.

In step S136 the registration request is sent to the secure element application 34 which is identified by the CINx 32 and AIDy 35 assigned to the user. The content of the registration request may be the same as received in step S131 or it may be modified by the server application 14, as well as it may be converted to a format suitable for processing by the SE application 34. If conversion is necessary, it may be performed either by the server application 14 on the server 10 or on the card manager server 10a. The transmission of the registration request takes place over the local communication channel 83 established between the secure element reader interface 13 of the server 10 and the secure element reader 50 which is connected to the selected secure element 30. Known card management protocols may be used for addressing and communicating with the secure element 30 and the secure element application 34 running thereon.

In step S138 the secure element application 34 identified by AIDy 35 receives the registration request, which contains at least the RegID 71 of the user communication device 60 in the present embodiment.

In step S139 a user account 16 is created by processing the registration request by the SE application 34. This may include storing at least the received RegID 71 in the user account 16. Storing this information is not a precondition of successfully executing the registration process, though it makes account recovery simpler, if later needed.

In step S140 the SE application 34 running on the secure element 30 generates a unique ID (UI) 77 and stores it in the user account 16.

In the present embodiment the unique ID 77 is first concatenated with the CINx 32 and AIDy 35 in step S142a. The CINx 32 and AIDy 35 identify the given SE application 34, hence these data are generally available to the SE application 34, however, these data may also be communicated to the SE application 34 by the server application 14, for example the server application 14 may include the CINx 32 and the AIDy 35 in the registration request transmitted in step S136, in which case these may be stored in the user account 16 as well.

It is also conceivable to concatenate only one or some of the aforementioned data with the unique ID 77 or to include more data, e.g. the RegID 71.

In the present embodiment the unique ID 77 is used to generate a one-time-password together with other data, however, it would also be possible to use only the unique ID 77 itself as the one-time password.

In step S142 the SE application 34 generates a first cryptographic hash (H1) 75 from the concatenated data containing the unique ID 77 and the CINx 32 and AIDy 35.

The hash 75 is then transmitted from the SE application 34 to the user application 64 over the third communication channel 83 in step S144 as a response to the registration request. This response serves also as a registration confirmation message from the SE application 34. The server application 14 generates and sends the mobile push message with the help of the external push server 90 using the RegID 71 for addressing the user application which action also includes performing the necessary modifications (e.g. adding appropriate message heading) for being able to send it as a push message via the push server 90. (For other messaging types, like SMS, different message transformation is performed and instead of the push server an SMS gateway is used.) The benefits of sending the one-time password in a mobile push message are the same as described earlier.

The user application 64 receives the push message in step S02 and stores the first hash 75, which will be used as a one-time password in a subsequent transaction as will be explained in more detail in connection with FIGS. 7a-7c.

In step S146 a registration confirmation message is generated by the server application 14 on the server 10, which includes the CINx 32 and the AIDx 35 identifying the secure element application 34 assigned to the user and is sent to the user application 64 of the user communication device 60 in step S148 over the electronic communication channel 81 which is preferably still open.

In step S03 the registration confirmation message is received and processed by the user application 64 and the CINx 32 and the AIDx 35 are stored by the user application 64. The registration confirmation message confirms that the registration process has been completed. This registration confirmation message may be optional as all the necessary information confirming the registration may be included in the push message.

After this the electronic communication channel 81 can be closed.

The steps of providing a secure element service by the secure element application 34 are illustrated in the flow diagram of FIGS. 7a to 7c.

The steps performed by the user via his or her user communication device 60 are not necessarily part of the method according to the invention, however, for the sake of completeness these steps are described briefly as well. In step S04 the user application 64 of the communication device 60 creates a secure element service request containing at least the hash 75, the CINx 32 and the AIDx 35 previously received by the user application 64. The secure element service request may further contain transaction data for performing the requested secure element service in the same or in a separate message.

In step S160 the electronic communication channel 81 is established again between the server application 14 running on the cloud server 10 and the user application 64 running on the remote client communication device 60 over the Internet. In step S161 the secure element service request is received by the server application 14 over the electronic communication 81 channel.

In step S162 the secure element 34 assigned to the user is identified based on the CINx 32 and the AIDx 35 contained in the secure element service request.

In step S164 the secure element service request, modified as necessary to be processed by the SE application, is sent from the server application 14 to the identified SE application 34 over the third communication channel 83.

The SE application 34 receives the service request in step S166.

In step S168 the SE application 34 validates the received hash by either retrieving the hash 75 stored in the user account 16 (as shown in FIG. 7b) or regenerating the hash 75 and comparing it with the received hash 75 in step S174. If the stored/regenerated hash 75 and the received hash 75 correspond then the validation is successful, and the SE application proceeds by processing the SE service request in step S176. If the stored/regenerated hash 75 and the received hash 75 do not match, then an error message may be sent back to the user application 64 via the server application 14 (not shown).

In step S178 a new unique identifier 77' is generated by the SE application 34 to be used as a one-time password during a subsequent transaction. In the present case the unique identifier 77' is used as one-time password by first concatenating the unique identifier 77' with the CINx 32 and the AIDx 35 in step S180a and then generating a new hash 75" therefrom in step S180.

The secure element application 34 provides the requested secure element service in the form of a transaction response in step 184 as explained in connection with the previous embodiment. The provision of the requested secure element service may require various types of verifications, data processing or crypto functions at the secure element application 34 as explained above.

The transaction response is sent to the server application 14 over the third communication channel 83 and it is forwarded to the user application 64 therefrom after the necessary transformation over the first communication channel 81 in step S185. It is noted that the secure element service request may be sent in more than one messages. In this case the messages are identified as belonging together by the server application 14 of the cloud server 10 either by their message IDs, session IDs, or based on the fact that they were using the same communication channel or by other technical means commonly used in communication management.

The transaction response preferably contains the newly generated hash 75", however, this may be sent in a separate message. It is noted that other type of one-time-password may also be used instead of the above described hash, e.g. the newly generated unique identifier 77' alone may also serve as the one-time password.

The user application 64 receives and stores the new one-time password (hash 75" in the present case) in step S05, which is used to validate the user application 64 during the next service request.

It will be apparent to those skilled in the art that various modifications are conceivable to the above disclosed embodiments without departing from the scope of protection determined by the appended claims. For example, the order of the steps may differ from the order presented here or some may be only optional ones. Also, some of the steps presented here may be carried out in more steps sequentially or in parallel, as the case may be.

The invention claimed is:

1. A cloud computing environment for providing remote secure element services, comprising:
    at least one server;
    a plurality of secure elements being connectable to the at least one server, wherein each one of the plurality of secure elements comprises a separate chip providing a tamper resistant processing environment separate from the server, each secure element having a secure element identifier and comprising at least one secure element application having a secure element application identifier, wherein each secure element application is executed on each respective secure element, each secure element application being uniquely addressable by the at least one server using a unique address comprising the secure element identifier of the secure element containing the given secure element application and the secure element application identifier of the given secure element application; and
    a database containing a list of the unique addresses.

2. The cloud computing environment according to claim 1, wherein the at least one secure element comprises at least two secure element applications.

3. The cloud computing environment according to claim 1, wherein a plurality of user accounts is stored on the at least one server, and a plurality of the uniquely addressable secure element application are each assigned to one of said plurality of user accounts.

4. A method for providing remote secure element services in a cloud computing environment, comprising:
    assigning one secure element application on one assigned secure element of a plurality of secure elements to a user, the assigned secure element having a secure element identifier and the assigned secure element application having a secure element application identifier, wherein each secure element of the plurality of secure elements comprises at least one secure element application and is connected to at least one server, wherein each one of the plurality of secure elements comprises a separate chip providing a tamper resistant processing environment separate from the server, and wherein each secure element application is executed on each respective secure element;
    receiving by the server a secure element service request from a communication device of the user over an electronic communication channel,
    executing the secure element service request by:
        identifying the secure element application assigned to the user based on the secure element identifier and the secure element application identifier;
        forwarding the secure element service request to the assigned secure element application;
        processing the secure element service request by the assigned secure element application; and
        sending a transaction response to the user communication device.

5. The method according to claim 4, wherein the at least one secure element comprises at least two secure element applications, and each secure element application is uniquely addressable by the secure element identifier of the secure element containing the given secure element application and the secure element application identifier of the given secure element application.

6. The method according to claim 4, wherein the secure element service request comprises a user specific data, a service request validator, and transaction information.

7. The method according to claim 6, wherein the user specific data comprises at least one of a username, a user application identifier (RegID), a device identifier (IMEI number) or other data suitable for identifying a user, the user communication device, or the user application running on the user communication device.

8. The method according to claim 6, wherein the service request validator corresponds to data sent to the user communication device as part of a previous transaction response or as part of a registration confirmation message sent to the user communication device after the secure element application is assigned to the user to be used in a subsequent secure element service request.

9. The method according to claim 8, comprising:
generating the service request validator by the at least one server or the secure element application assigned to the user or jointly by the server and the assigned secure element application.

10. The method according to claim 9, comprising:
regenerating the service request validator by the at least one server or the secure element application assigned to the user or jointly by the server and the assigned secure element application; and
comparing the received service request validator and the regenerated service request validator by the at least one server or in the secure element application assigned to the user.

11. The method according to claim 9, comprising:
retrieving the service request validator from the at least one server or the secure element application assigned to the user; and
comparing the received service request validator and the retrieved service request validator by the at least one server or in the secure element application assigned to the user.

12. The method according to claim 8, comprising:
routing the service request validator to the user communication device through a second electronic communication channel differing from a first electronic communication channel through which the secure element service request or a registration request is received by the at least one server.

13. The method according to claim 12, comprising:
using the second electronic communication channel to send a PUSH message, comprising at least one of a mobile push message, an SMS, an e-mail, a chat message, or another electronic communication type directly addressable to the user.

14. The method according to claim 8, comprising:
routing the service request validator to the user through a same electronic communication channel through which the secure element service request or a registration request is received by the at least one server.

15. The method according to claim 8, wherein the service request validator is a one-time password selected from a group consisting of a unique ID, a hash of a unique ID, a combination of multiple data elements with a unique ID, and a hash of a combination of multiple data elements with a unique ID.

16. The method according to claim 4, wherein the secure element service request comprises personal identification data (PID) of the user, and wherein the method comprises:
authenticating the user based on the PID.

17. The method according to claim 16, comprising authenticating the user based on the PID by the at least one server or by the secure element application assigned to the user.

18. The method according to claim 4, comprising:
establishing the electronic communication channel over the Internet between the cloud computing environment and a user application on a remote communication device capable of receiving PUSH messages;
receiving a registration request from the user application over the first electronic communication channel for a secure element service, the registration request containing at least one user specific data, which can be used to address the PUSH message;
selecting a secure element and a secure element application thereon that is currently not assigned to any other user, assigning the selected secure element and the selected secure element application to the user;
transmitting the registration request to the assigned secure element application on the assigned secure element addressed by the secure element identifier of the assigned secure element and the secure element application identifier of the assigned secure element application;
creating a user account in response to the registration request by the assigned secure element application;
generating a unique identifier by the assigned secure element application;
storing the unique identifier or data generated from the unique identifier in the user account by the assigned secure element application;
transmitting as a one-time password the unique identifier or the data generated from the unique identifier from the secure element with the help of the server to the user communication device in a PUSH message using the user specific data for addressing the PUSH message;
transmitting the secure element identifier of the assigned secure element and the secure element application identifier of the assigned secure element application to the user communication device from the server;
receiving the secure element service request from the user application on the remote communication device over the electronic communication channel, the secure element service request containing at least the secure element identifier and the secure element application identifier of the secure element and the secure element application assigned to the user and the one-time password;
identifying the secure element application assigned to the user based on the secure element identifier and the secure element application identifier;
forwarding the secure element service request to the assigned secure element application;
processing the secure element service request by the assigned secure element application by:
retrieving the unique identifier or the data generated from the unique identifier stored in the user account and optionally regenerating the one-time password;
validating the user by comparing the received one-time password with the stored or newly generated one-time password; and
executing the secure element service request in case of successful validation; and
sending a transaction response from the assigned secure element to the user communication device with the use of the server.

19. The method according to claim 4, comprising:

establishing a first electronic communication channel over the Internet between the cloud computing environment and a user application on a remote communication device capable of receiving push messages;

receiving a registration request from the user application over the first electronic communication channel for a secure element service, the registration request containing at least a user name, personal identification data of a user and at least one user specific data including at least an identifier of the user application;

creating a user account in response to the registration request, and storing at least the secure element identifier, the secure element application identifier and the user name for said user account;

storing the personal identification data of the user in the assigned secure element application;

generating and storing a unique identifier for the user account;

generating a cryptographic hash of at least the unique identifier;

transmitting as a one-time password the hash to the user application in a push message using the user application identifier;

establishing the electronic communication channel over the Internet between the cloud computing environment and said user application on said remote communication device;

receiving the secure element service request from the user application on the remote communication device over the electronic communication channel, the secure element service request containing at least the hash, the user name and the personal identification data of the user;

identifying the user account based on the secure element service request;

retrieving the unique identifier stored for the identified user account and regenerating the hash;

validating the user application by comparing the received hash with the newly generated hash;

in case of correspondence, transmitting at least the personal identification data to the assigned secure element application;

authenticating the user by the secure element application based on the stored and the received personal identification data; and executing the secure element service request in case of successful authentication.

20. The method according to claim 4, comprising:

establishing a first electronic communication channel over the Internet between the cloud computing environment and a user application on a remote communication device capable of receiving push messages;

receiving a registration request from the user application over the first electronic communication channel for a secure element service, the registration request containing at least personal identification data of a user and at least one user specific data including at least an identifier of the user application;

creating a user account in response to the registration request, and storing at least the secure element identifier, the secure element application identifier and at least one user specific data for said user account;

storing the personal identification data of the user in the assigned secure element application;

generating and storing a unique identifier in the user account;

transmitting as a one-time password the unique identifier or data generated from the unique identifier to the user application in a push message using the user application identifier;

establishing the electronic communication channel over the Internet between the cloud computing environment and said user application on said remote communication device;

receiving the secure element service request from the user application on the remote communication device over the electronic communication channel, the secure element service request containing at least the one-time password, the at least one user specific data and the personal identification data of the user;

identifying the user account based on the secure element service request;

retrieving the unique identifier stored in the identified user account and optionally regenerating the one-time password from the unique identifier;

validating the user application by comparing the received one-time password with the stored or newly generated one-time password;

in case of correspondence, transmitting at least the personal identification data to the assigned secure element application;

authenticating the user by the secure element application based on the stored and the received personal identification data; and executing the secure element service request in case of successful authentication.

\* \* \* \* \*